US011301086B2

(12) United States Patent
Muguruma et al.

(10) Patent No.: US 11,301,086 B2
(45) Date of Patent: Apr. 12, 2022

(54) TOUCH PANEL DRIVING DEVICE, TOUCH PANEL DEVICE, TOUCH PANEL DRIVING METHOD

(71) Applicant: FUTABA CORPORATION, Mobara (JP)

(72) Inventors: Takashi Muguruma, Mobara (JP); Terukazu Sugimoto, Mobara (JP); Katsumi Takayama, Mobara (JP); Hiroyuki Tanaka, Mobara (JP)

(73) Assignee: FUTABA CORPORATION, Mobara (JP)

( * ) Notice: Subject to any disclaimer, the term of this patent is extended or adjusted under 35 U.S.C. 154(b) by 0 days.

(21) Appl. No.: 16/449,654

(22) Filed: Jun. 24, 2019

(65) Prior Publication Data

US 2020/0004400 A1    Jan. 2, 2020

(30) Foreign Application Priority Data

Jun. 29, 2018  (JP) .............................. JP2018-124284

(51) Int. Cl.
*G06F 3/041*        (2006.01)
*G06F 3/044*        (2006.01)

(52) U.S. Cl.
CPC .......... *G06F 3/04182* (2019.05); *G06F 3/044* (2013.01); *G06F 3/04166* (2019.05)

(58) Field of Classification Search
CPC ... G06F 3/04182; G06F 3/044; G06F 3/04166
See application file for complete search history.

(56) References Cited

U.S. PATENT DOCUMENTS 4,323,798 A * 4/1982 Watkins ............... G11C 27/026
                                                     327/561
10,705,654 B2 * 7/2020 Kim ..................... G06F 3/0446
(Continued)

FOREIGN PATENT DOCUMENTS

JP          H7-200147 A      8/1995
KR    10-2012-0025323 A      3/2012
(Continued)

OTHER PUBLICATIONS

Taiwanese Office Action in corresponding Taiwanese Application No. 108122375 dated Mar. 16, 2020.
(Continued)

*Primary Examiner* — Benyam Ketema
(74) *Attorney, Agent, or Firm* — Bacon & Thomas, PLLC

(57) ABSTRACT

A touch panel driving device is provided for sequentially performing a scanning of selecting a pair of transmission signal lines from N number of transmission signal lines and a pair of reception signal lines from M number of reception signal lines. The touch panel driving device includes a reception circuit for respectively receiving, from the pair of reception signal lines, reception signals whose waveforms are changed due to a capacitance change caused by a touch operation and for generating a detection value for detecting the touch operation by comparing the received reception signals, and a plurality of noise filters provided in signal paths from the M number of reception signal lines to the reception circuit for performing a filtering operation of the same filtering characteristics on each of the reception signals supplied to the reception circuit from the pair of reception signal lines.

6 Claims, 18 Drawing Sheets

(56) References Cited

U.S. PATENT DOCUMENTS

| | | | | |
|---|---|---|---|---|
| 2007/0281430 | A1* | 12/2007 | Hirabayashi | H01L 27/124 438/297 |
| 2010/0139991 | A1* | 6/2010 | Philipp | G06F 3/044 178/18.06 |
| 2011/0267296 | A1* | 11/2011 | Noguchi | G06F 3/0412 345/173 |
| 2012/0056834 | A1 | 3/2012 | Kim et al. | |
| 2013/0038570 | A1 | 2/2013 | Seo et al. | |
| 2013/0063395 | A1 | 3/2013 | Byun et al. | |
| 2013/0300690 | A1* | 11/2013 | Yang | G06F 3/044 345/173 |
| 2014/0085246 | A1* | 3/2014 | Shahparnia | G06F 3/0443 345/174 |
| 2014/0333575 | A1 | 11/2014 | Hu | |
| 2015/0062081 | A1 | 3/2015 | Lee et al. | |
| 2015/0138145 | A1* | 5/2015 | Hwang | G06F 3/0418 345/174 |
| 2016/0124540 | A1* | 5/2016 | Chung | G06F 3/0416 345/174 |
| 2016/0282991 | A1* | 9/2016 | Wu | G06F 3/041662 |
| 2016/0370949 | A1 | 12/2016 | Park et al. | |

FOREIGN PATENT DOCUMENTS

| | | |
|---|---|---|
| KR | 10-2013-0018063 A | 2/2013 |
| KR | 10-2013-0028628 A | 3/2013 |
| KR | 10-2013-0059095 A | 6/2013 |
| KR | 10-2013-0120134 A | 11/2013 |
| KR | 10-2016-0150574 A | 12/2016 |

OTHER PUBLICATIONS

Office Action dated Sep. 24, 2020, issued in corresponding Korean application No. 10-2019-0076749.

Search Report dated Sep. 17, 2021, issued in corresponding French application No. 19 06 866 (not attached).

\* cited by examiner

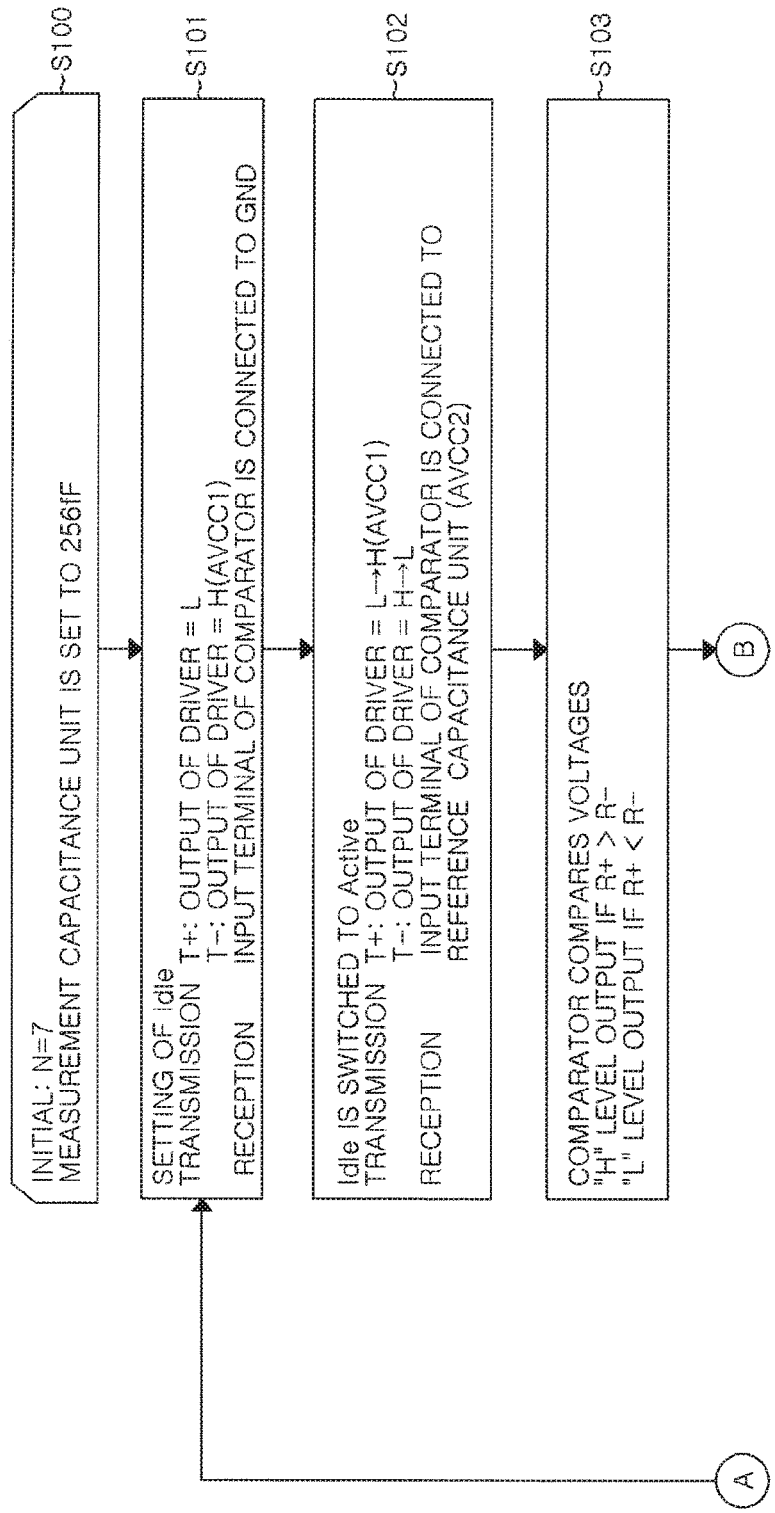

FIG. 9

| Command | | | | Filter setting | | Internal setting | | | | | | |
|---|---|---|---|---|---|---|---|---|---|---|---|---|
| LPFEN | LPFR[1] | LPFR[0] | LPFC | R | C | S4 | S3 | S2 | S1 | S0 | SC1 | SC0 |
| 0 | × | × | × | Bypass | Open | OFF | OFF | OFF | OFF | ON | OFF | OFF |
| 1 | 0 | 0 | × | 5KΩ | – | OFF | OFF | OFF | ON | OFF | – | – |
| 1 | 0 | 1 | × | 10KΩ | – | OFF | OFF | ON | OFF | OFF | – | – |
| 1 | 1 | 0 | × | 20KΩ | – | OFF | ON | OFF | OFF | OFF | – | – |
| 1 | 1 | 1 | × | 50KΩ | – | ON | OFF | OFF | OFF | OFF | – | – |
| 1 | × | × | 0 | – | 2pF | – | – | – | – | – | OFF | ON |
| 1 | × | × | 1 | – | 10pF | – | – | – | – | – | ON | OFF |

FIG. 11

| FILTER FUNCTION SET VALUE | IC | | SET VALUE (REGISTER VALUE) | CUTOFF FREQUENCY [MHz] |
|---|---|---|---|---|
| | Filter setting | | | |
| | R | C | | |
| 0 | Short | Open | 0x00 | - |
| 1 | 5KΩ | 2pF | 0x01 | 15.9 |
| 2 | 10KΩ | 2pF | 0x03 | 8.0 |
| 3 | 20KΩ | 2pF | 0x05 | 4.0 |
| 4 | 5KΩ | 10pF | 0x09 | 3.2 |
| 5 | 50KΩ | 2pF | 0x07 | 1.6 |
| 6 | 10KΩ | 10pF | 0x0B | 1.6 |
| 7 | 20KΩ | 10pF | 0x0D | 0.8 |
| 8 | 50KΩ | 10pF | 0x0F | 0.3 |

TOUCH PANEL DRIVING DEVICE, TOUCH PANEL DEVICE, TOUCH PANEL DRIVING METHOD

FIELD OF THE INVENTION

The present disclosure relates to a touch panel driving device, a touch panel device, and a touch panel driving method; and, more particularly, to a technique for improving touch detection accuracy.

BACKGROUND OF THE INVENTION

Various techniques related to a touch panel are known. Japanese Patent Application Publication No. 2014-219961 discloses a sensing technique for improving resolution by detecting a touch position by simultaneously sensing two sets of signal lines (electrodes). Further, Japanese Patent Application Publication No. 2010-182277 discloses a so-called single layer structure in which a portion where electrodes intersect with each other in electrode wirings in X and Y directions is not provided.

In the case of a capacitive touch panel, touch coordinates may be detected due to the influence of external noise (electromagnetic noise) even when there is no finger touch. This phenomenon is referred to as "false touch". The false touch needs to be prevented because it deteriorates the sensing accuracy of the touch panel device. Therefore, it is considered to have a filter (e.g., a low pass filter (LPF)) in a detection signal path and cut off a high frequency external noise component. However, the filter may affect the performance in detecting capacitance changes. In view of the above, the present disclosure provides a touch panel device capable of maintaining satisfactory sensing accuracy even in an external noise environment.

SUMMARY OF THE INVENTION

In accordance with an aspect of the present disclosure, there is provided a touch panel driving device for sequentially performing a scanning of selecting a pair of adjacent transmission signal lines from N number of transmission signal lines and a pair of adjacent reception signal lines from M number of reception signal lines arranged on a touch panel wherein M and N are a natural number of 3 or more, the touch panel driving device including: a reception circuit configured to respectively receive, from the pair of adjacent reception signal lines of the touch panel, reception signals whose waveforms are changed due to a capacitance change caused by a touch operation and generate a detection value for detecting the touch operation on the touch panel by comparing the received reception signals; and a plurality of noise filters provided in signal paths from the M number of reception signal lines of the touch panel to the reception circuit and configured to perform a filtering operation of the same filtering characteristics on each of the reception signals supplied to the reception circuit from the pair of adjacent reception signal lines.

In the touch panel driving device described above, each of the noise filters may include resistors having the same resistance values and capacitive elements having the same capacitance values. The noise filters have the same filter characteristics by, e.g., each filter having an RC (resistor and capacitor) circuit as an LPF with elements of the same values.

The touch panel driving device described above may further include a selection circuit configured to sequentially select and electrically connect two reception signal lines from the M number of reception signal lines arranged on the touch panel with two reception signal lines separately provided between the touch panel and the reception circuit for supplying the reception signals to the reception circuit. The noise filters may be provided on signal paths of the separately provided two reception signal lines respectively between the selection circuit and the reception circuit.

In the reception circuit, the reception signals received from the selection circuit via the separately provided two reception signal lines are compared with each other. The noise filters are provided in paths of the separately provided two reception signal lines, respectively.

In the touch panel driving device described above, each of the noise filters may be configured to have a plurality of resistors having different resistance values and a plurality of capacitors having different capacitance values and switchably select the resistors and/or the capacitors.

In each of the noise filters serving as a passive RC circuit, necessary number of resistors for the filter operation can be switchably selected and necessary number of capacitors for the filter operation can be switchably selected.

In the touch panel driving device described above, each of the noise filters may switch the resistors or the capacitors depending on a noise level detected by the reception circuit. With this configuration, the characteristics of each of the noise filters are variably controlled depending on the noise level.

In the touch panel driving device described above, each of the noise filters may switch the resistors or the capacitors according to a scanning timing of the pair of adjacent transmission signal lines arranged on the touch panel or a scanning timing of the pair of adjacent reception signal lines arranged on the touch panel. For example, a plurality of areas is set for the transmission signal lines and the reception signal lines, and the RC elements performing the filter operation are switched for each area to be scanned, each area being defined by the transmission signal lines and the reception signal lines.

In accordance with another aspect of the present disclosure, there is provided a touch panel device including a touch panel and the touch panel driving device described above. That is to say, it is possible to provide the touch panel device capable of reducing the influence of an external noise and having a higher sensing accuracy.

In the touch panel device described above, the noise filters may be respectively provided for the M number of the reception signal lines arranged on the touch panel. In other words, for the individual reception signal lines arranged on the touch panel, one noise filter serving as an RC circuit is provided.

In accordance with still another aspect of the present disclosure, there is provided a touch panel driving method including: sequentially performing a scanning of selecting a pair of adjacent transmission signal lines and a pair of adjacent reception signal lines arranged on a touch panel; performing a filtering operation of the same filtering characteristics on each of reception signals supplied from the pair of adjacent reception signal lines to a reception circuit on signal paths from the M number of reception signal lines of the touch panel to the reception circuit; and allowing the reception circuit to respectively receive, from the pair of adjacent reception signal lines of the touch panel, the reception signals whose waveforms are changed due to a capacitance change caused by a touch operation and generate a detection value for detecting the touch operation on the touch panel by comparing the reception signals. That is to say, it is possible to provide the touch panel device capable of reducing the influence of an external noise and having a higher sensing accuracy.

In accordance with the aspects of the present disclosure, it is possible to reduce the influence of the external noise and realize high-accuracy detection of the touch panel manipulation. Further, by using the noise filters of the same characteristics for two reception signals to be compared in the difference detection scheme, there is little deterioration in the detection performance even with the insertion of the filter.

BRIEF DESCRIPTION OF THE DRAWINGS

The objects and features of the present disclosure will become apparent from the following description of embodiments, given in conjunction with the accompanying drawings, in which:

FIGS. 5A and 5B are a flowchart of a sequence of the sensing operation according to one embodiment;

FIG. 9 shows a setting of the noise filter according to the third embodiment;

FIG. 11 shows set values of the noise filter according to the third embodiment;

DETAILED DESCRIPTION OF THE EMBODIMENTS

Hereinafter, an embodiment of the present disclosure will be described in the following sequence.

<1. Configuration of touch panel device according to first embodiment>
<2. Sensing operation>
<3. Second embodiment>
<4. Third embodiment>
<5. Fourth embodiment>
<6. Fifth embodiment>
<7. Effect of embodiment and modification>

In the embodiment, a touch panel device 1 corresponds to a touch panel device to be described in the claims. Further, a touch panel driving device 3 corresponds to a touch panel driving device to be described in the claims. Although the touch panel driving device 3 includes a sensor IC 4 and a micro control unit (MCU) 5 in the embodiment, the configuration of the touch panel driving device to be described in the claims is not limited thereto. For example, the touch panel driving device to be described in the claims may include only the sensor IC 4.

1. Configuration of Touch Panel Device According to First Embodiment

Figure 1:
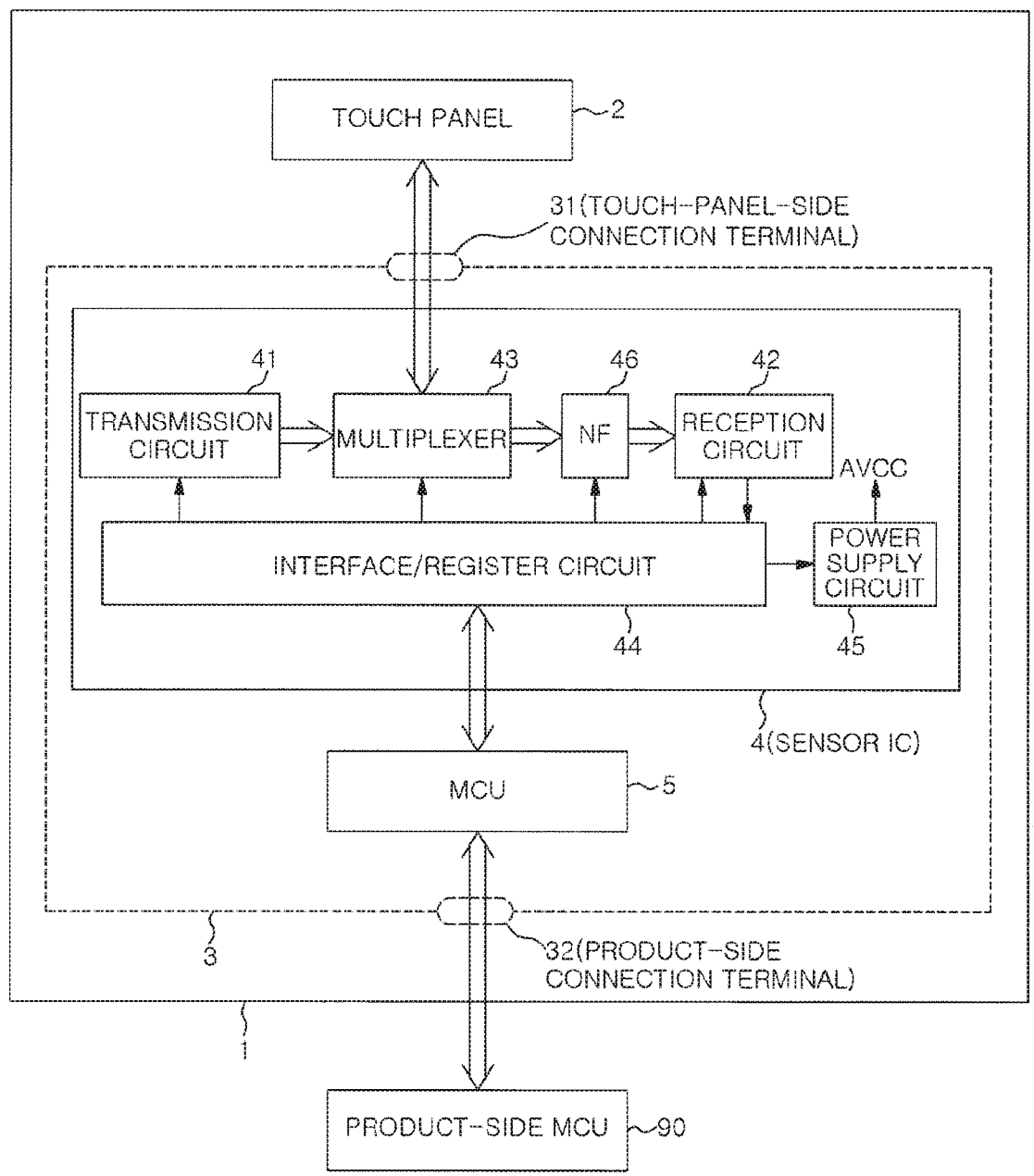
FIG. 1 is a block diagram of a touch panel device according to a first embodiment.

FIG. 1 shows a configuration example of a touch panel device 1 according to an embodiment. The touch panel device 1 is installed as a user interface device in various apparatuses. The various apparatuses include, e.g., an electronic equipment, a communication equipment, an information processing equipment, a manufacturing equipment, a machine tool, a vehicle, an aircraft, a building facility equipment, and other apparatuses in various fields. The touch panel device 1 is adopted as an operation input device for allowing a user to input an operation in various products. FIG. 1 shows the touch panel device 1 and a product-side micro control unit (MCU) 90. The product-side MCU 90 indicates a control device of an apparatus having the touch panel device 1. The touch panel device 1 provides information on user's operation on the touch panel to the product-side MCU 90.

The touch panel device 1 includes a touch panel 2 and a touch panel driving device 3. The touch panel driving device 3 includes a sensor integrated circuit (IC) 4 and a micro control unit (MCU) 5. The touch panel driving device 3 is connected to the touch panel 2 through a touch-panel-side connection terminal 31. The touch panel driving device 3 drives (senses) the touch panel 2 through the above connection. When the touch panel driving device 3 is installed as an operation input device at an apparatus, the touch panel driving device 3 is connected to the product-side MCU 90 through a product-side connection terminal 32. With this connection, the touch panel driving device 3 transmits the sensed operation information to the product-side MCU 90.

The sensor IC 4 in the touch panel driving device 3 includes a transmission circuit 41, a reception circuit 42, a multiplexer 43, an interface/register circuit 44, a power supply circuit 45, and a noise filter (NF) 46.

The transmission circuit 41 of the sensor IC 4 outputs a transmission signal to a terminal on the touch panel 2 selected by the multiplexer 43. The reception circuit 42 receives a signal from a terminal on the touch panel 2 selected by the multiplexer 43 through the noise filter 46, and performs a required comparison process or the like.

Figure 2:
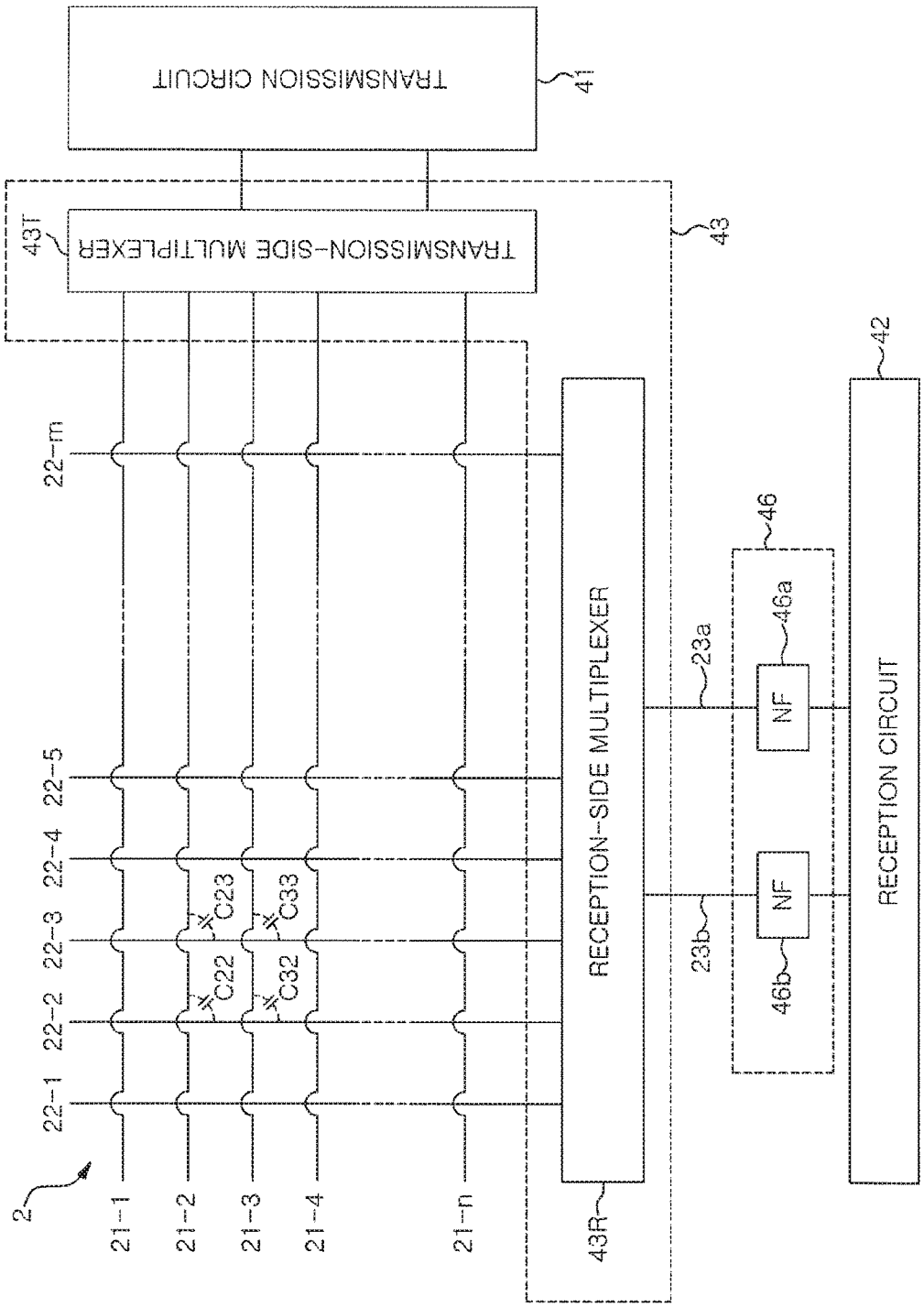
FIG. 2 shows an arrangement of noise filters in the first embodiment.

FIG. 2 schematically shows the connection state of the transmission circuit 41, the reception circuit 42, the multiplexer 43, the noise filter 46, and the touch panel 2. In the touch panel 2, N-number of transmission signal lines 21-1 to 21-$n$ as transmission-side electrodes are arranged on a panel plane forming a touch surface. Similarly, M-number of reception signal lines 22-1 to 22-$m$ as reception-side electrodes are arranged on the same panel plane. The transmission signal lines 21-1 to 21-$n$ are collectively referred to as "transmission signal line(s) 21" and the reception signal lines 22-1 to 22-$m$ are collectively referred to as "reception signal line(s) 22", unless otherwise distinguished.

The transmission signal lines 21-1 to 21-$n$ and the reception signal lines 22-1 to 22-$m$ may be arranged to intersect with each other as shown in FIG. 2. Alternately, in a so-called single layer structure, they may be arranged without intersecting with each other, as disclosed in Japanese Patent Application Publication No. 2010-182277. In any case, a touch operation surface is formed within the range where the transmission signal lines 21 and the reception signal lines 22 are arranged, and a touched position is detected by capacitance changes due to the touch activity. In FIG. 2, only a part of capacitances (capacitances C22, C23, C32, and C33) generated between the transmission signal lines 21 and the reception signal lines 22 are illustrated. However, capacitances are generated between the transmission signal lines 21 and the reception signal lines 22 (e.g., capacitances at the intersecting positions) on the entire touch operation surface, and the position where the capacitance is changed by the touch activity is detected by the reception circuit 42.

In the example shown in FIG. 2, a transmission-side multiplexer 43T and a reception-side multiplexer 43R are illustrated as the multiplexer 43. The transmission circuit 41 outputs transmission signals to the transmission signal lines 21-1 to 21-$n$ selected by the transmission-side multiplexer 43T. In the embodiment, scanning is performed in such a way that the transmission multiplexer 43T selects two adjacent transmission signal lines 21 at each scanning time. The reception circuit 42 receives the reception signals from the reception signal lines 22-1 to 22-$m$ selected by the reception-side multiplexer 43R. In the embodiment, the reception multiplexer 43R selects two adjacent reception signal lines 22 at each scanning timing. In this example, two reception signal lines 23$a$ and 23$b$ are disposed between the reception-side multiplexer 43R and the reception circuit 42, and noise filters 46$a$ and 46$b$ are provided in the reception signal lines 23$a$ and 23$b$, respectively.

The noise filters 46$a$ and 46$b$ and/or noise filters 46-1 to 46-$m$ to be described in a second embodiment are collectively referred to as "noise filter(s) 46" unless otherwise distinguished.

The sensing operation of the transmission circuit 41 and the reception circuit 42 will be described later.

Referring back to FIG. 1, various setting information on the transmission circuit 41, the multiplexer 43, the reception circuit 42, the power supply circuit 45, and the noise filter 46 are stored in the interface/register circuit 44 of the sensor IC 4 by the MCU 5. The operations of the transmission circuit 41, the multiplexer 43, the reception circuit 42, the power supply circuit 45, and the noise filter 46 are controlled by the setting information stored in the interface/register circuit 44. A detection value (also referred to as "RAW value") detected by the reception circuit 42 is stored in the interface/register circuit 44 so that it can be acquired by the MCU 5.

The power supply circuit 45 generates a driving voltage AVCC and supplies the driving voltage AVCC to the transmission circuit 41 and the reception circuit 42. As will be described later, the transmission circuit 41 applies pulses using the driving voltage AVCC to the transmission signal lines 21 selected by the multiplexer 43. The reception circuit 42 applies the driving voltage AVCC to the reception signal lines 22 selected by the multiplexer 43 during the sensing operation.

The MCU 5 sets and controls the sensor IC 4. Specifically, the MCU 5 stores required setting information in the interface/register circuit 44 and controls the operations of the respective components of the sensor IC 4. Further, the MCU 5 reads out and obtains the RAW value from the reception circuit 42 through the interface/register circuit 44. Then, the MCU 5 calculates the coordinates of the touch panel using the RAW value and transmits the coordinates as the information of user-touched position to the product MCU 90.

2. Sensing Operation

Hereinafter, a sensing operation of the touch panel device 1 having the above configuration will be described.

Figure 3:
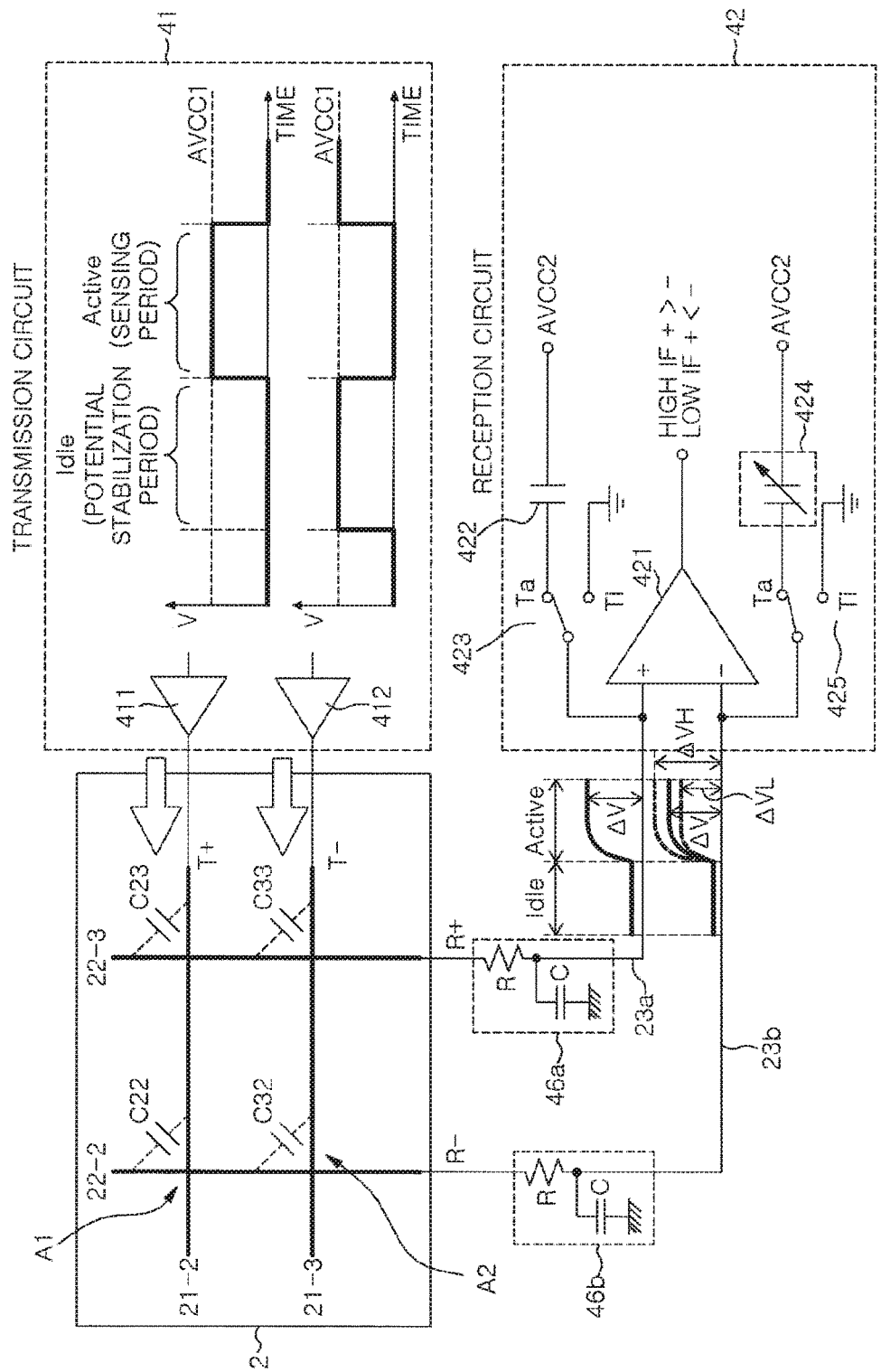
FIG. 3 shows a sensing operation according to one embodiment.

First, the operations of the transmission circuit 41 and the reception circuit 42 on the touch panel 2 will be described with reference to FIG. 3. In FIG. 3, two transmission signal lines 21-2 and 21-3 and two reception signal lines 22-2 and 22-3 on the touch panel 2 are illustrated. Although the multiplexer 43 (the transmission-side multiplexer 43T and the reception-side multiplexer 43R) is omitted in FIG. 3, the reception signal lines 23$a$ and 23$b$ indicate paths from the reception-side multiplexer 43R to the reception circuit 42. In other words, the reception signal lines 23$a$ and 23$b$ are connected to the two reception signal lines 22-2 and 22-3 by the reception-side multiplexer 43R.

In the embodiment, the transmission circuit 41 and the reception circuit 42 transmit and receive signals to and from two adjacent transmission signal lines 21 and two adjacent reception signal lines 22 shown in FIG. 2, thereby detecting the user's touch activity. In other words, scanning for the detection of the user's touch activity is performed sequentially on a 2 by 2 cell basis, i.e., the cell including a pair of the transmission signal lines 21 (21-1 and 21-3) and a pair of the reception signal lines 22 (22-2 and 22-3). In FIG. 3, one cell is illustrated.

The transmission circuit 41 outputs driving voltages AVCC1 from drivers 411 and 412 to two transmission signal lines 21 ('21-2' and '21-3' in FIG. 3), respectively. In other words, transmission signals T+ and T−, which are the outputs of the drivers 411 and 412, are respectively supplied to the transmission signal lines 21-2 and 21-3 selected by the multiplexer 43.

Driving voltage AVCC1 may be the value of the driving voltage AVCC itself generated by the power supply circuit 45 shown in FIG. 1 or other value based on the driving voltage AVCC. As shown in FIG. 3, in the transmission circuit 41, the transmission signal T+ from the driver 411 is set to a low level (hereinafter, referred to as "L level"), e.g., 0 V, during the idle period. During the subsequent active period (sensing period), the transmission signal T+ from the driver 411 is set to a high level (hereinafter referred to as "H level"). In this case, specifically, the driving voltage AVCC1 is applied as the H level signal. Further, in the transmission circuit 41, the transmission signal T− from the other driver 412 is set to the H level during the idle period (application of the driving voltage AVCC1), and set to the L level during the subsequent active period. Here, during the idle period, the potentials of the reception signals R+ and R− are stabilized, and during the active period, the potential changes of the reception signals R+ and R− are sensed.

During the idle period and the active period, a comparator 421 of the reception circuit 42 receives the reception signals R+ and R− from the two reception signal lines 22 ('22-3' and '22-2' in FIG. 3) selected by the multiplexer 43 through the reception signal lines 23$a$ and 23$b$. The noise filters 46$a$ and 46$b$ each constituting a low pass filter (LPF) as a passive circuit using a resistor R and a capacitor C are provided in the reception signal lines 23$a$ and 23$b$, respectively, and the reception signals R+ and R− with frequency lower than a cut-off frequency is inputted to the comparator 421 after frequency thereof higher than the cut-off frequency is blocked by the noise filters 46$a$ and 46$b$. Here, the noise filters 46$a$ and 46$b$ includes the resistors R having the same resistance value and the capacitors C having the same capacitance value. Accordingly, the filtering operations of the filtering characteristics (cut-off frequency and attenuation characteristics) same as those of the noise filters 46$a$ and 46$b$ are performed. The comparator 421 compares the potentials between the two reception signals R+ and R−, and outputs the comparison result as either the H level or the L level.

The reception circuit 42 includes a reference capacitance unit 422, switches 423 and 425, and a measurement capacitance unit 424, in addition to the comparator 421. A driving voltage AVCC2 is applied to one end of the capacitor constituting the reference capacitance unit 422. The driving voltage AVCC2 is the value of the driving voltage AVCC itself generated by the power supply circuit 45 shown in FIG. 1 or other value based on the driving voltage AVCC. The other end of the capacitor constituting the reference capacitance unit 422 is connected to a non-inverting (+) input terminal of the comparator 421 through a terminal Ta of the switch 423. The driving voltage AVCC2 is applied to one end of the measurement capacitance unit 424. The other end of the measurement capacitance unit 424 is connected to an inverting (−) input terminal of the comparator 421 through a terminal Ta of the switch 425.

In each of the switches 423 and 425, a terminal Ti is selected during the idle period. Therefore, during the idle period, the non-inverting input terminal (the reception signal line 22-3) and the inverting input terminal (the reception signal line 22-2) of the comparator 421 are grounded, and the reception signals R+ and R− have the ground potential. In each of the switches 423 and 425, the terminal Ta is selected during the active period. Therefore, during the active period, the driving voltage AVCC2 is applied to each of the non-inverting input terminal (the reception signal line 22-3) and the inverting input terminal (the reception signal line 22-2) of the comparator 421 through the reference capacitance unit 422 or the measurement capacitance unit 424.

In FIG. 3, the waveforms of the reception signals R+ and R− in a non-touch state of the cell are indicated by solid lines. In the idle period, the terminal Ti is selected in each of the switches 423 and 425 and, thus, the reception signals R+ and R− are stabilized at a certain potential (ground potential). In the active period, the terminal Ta is selected in each of the switches 423 and 425 and, thus, the driving voltage AVCC2 is applied to each of the reception signal lines 22-3 and 22-2. Accordingly, the potentials of the reception signals R+ and R− are increased by ΔV. In the non-touch state, the potentials of both reception signals R+ and R− are increased by ΔV. Meanwhile, in the transmission circuit 41, the transmission signal T+ becomes high and the transmission signal T− becomes low in the active period as described above. Therefore, when the touch operation is performed, the degree of potential increase of the reception signals R+ and R− is changed. If an A1 position that affects the capacitance C22 is touched, the potential of the reception signal R− is increased by ΔVH as indicated by a broken line during the active period. If an A2 position at which the capacitance C32 is changed is touched, the potential of the reception signal R− is increased by ΔVL as indicated by a broken line during the active period. In this manner, the potential change amount of the reception signal R− becomes greater or smaller than the potential change amount ΔV of the reception signal R+ depending on the touch position for each cell. The comparator 421 compares the reception signals R+ and R−.

The potential difference between the reception signals R+ and R− which are changed as described above may be outputted as the RAW value (detection result). However, in the embodiment, in order to obtain the RAW value, the reception circuit 42 changes the setting of the measurement capacitance unit 424 such that the voltage balance of the reception signals R+ and R− can be obtained.

Figure 4:
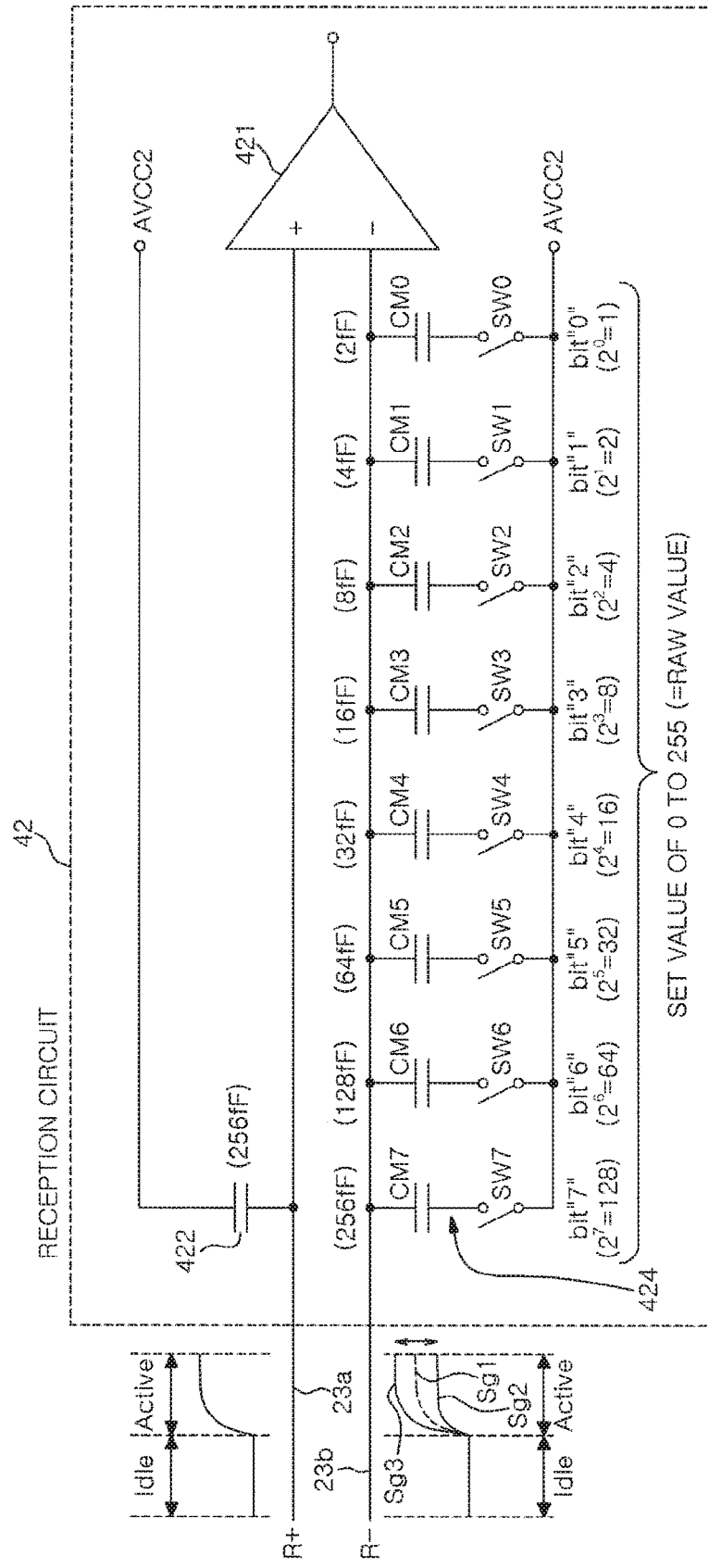
FIG. 4 shows a measurement capacitance unit according to one embodiment.

As shown in FIG. 4, the measurement capacitance unit 424 indicated as the variable capacitance capacitor in FIG. 3 includes, e.g., a plurality of capacitance units CM (CM0 to CM7) and switches SW (SW0 to SW7). Each of the switches SW0 to SW7 includes a switch element, e.g., a field effect transistor (FET) or the like. FIG. 4 shows an equivalent circuit in a state where the switches 423 and 425 are connected to the respective terminals Ta (active period). The illustration of the switches 423 and 425 is omitted in FIG. 4. The capacitance units CM0 to CM7 are connected in parallel between the potential of the driving voltage AVCC2 and the inverting input terminal of the comparator 421. The switches SW0 to SW7 are connected in series to the capacitance units CM0 to CM7, respectively. In other words, the capacitance unit CM that affects the reception signal R− can be changed by switching ON and OFF of the switches SW0 to SW7.

The capacitance values of the capacitance units CM0 to CM7 are selected in the following manner: CM0=2 fF (femto farad), CM1=4 fF, CM2=8 fF, CM3=16 fF, CM4=32 fF, CM5=64 fF, CM6=128 fF, CM7=256 fF. The capacitance values of the capacitance units CM0 to CM7 are selected as a value of 8 bits from bit "0" to bit "7". The capacitor CM0 and the switch SW0 function as bit "0"; the capacitor CM1 and the switch SW1 function as bit "1"; . . . the capacitor CM7 and the switch SW7 function as bit "7". A capacitance set value of 0 (i.e., "00000000") to 255 (i.e., "11111111") is given as a 8-bit value. The capacitance set value is one of the setting information stored in the interface register circuit 44 by the MCU 5. In the reception circuit 42, the switches SW0 to SW7 are switched on and off depending on the capacitance set value of 8 bits. In other words, the switches SW0 to SW7 are switched off when the corresponding bit is "0" and switched on when the corresponding bit is "1". Accordingly, the total capacitance value of the measurement capacitance unit 424 is varied in 256 steps within the range of 0 fF to 510 fF.

On the other hand, the capacitance value of the capacitor of the reference capacitance unit 422 on the reception signal R+ side is, e.g., 256 fF.

As described above, in the reception signal R−, the degree of potential increase of the waveform thereof in the active period is changed depending on the touch position and whether or not the touch has been made. The degree of potential increase becomes greater or smaller than the degree of waveform rise (the potential change amount) ΔV of the reception signal R+. In the configuration shown in FIG. 4, by changing the capacitance set value of the measurement capacitance unit 424, the degree of potential increase of the waveform of the reception signal R− can be changed. For example, it is possible to detect the capacitance set value of the measurement capacitance unit 424 which is equivalent to that of the reception signal R+. For example, on the assumption that a waveform Sg1 of the reception signal R− which is indicated by a broken line in FIG. 4 is in an initial state, if the capacitance of the measurement capacitance unit 424 is decreased, the waveform of the reception signal R− becomes the waveform Sg2 lower than the waveform Sg1. If the capacitance of the measurement capacitance unit 424 is increased, the waveform of the reception signal R− becomes the waveform Sg3 higher than the waveform Sg1. In other words, the capacitance set value of the measurement capacitance unit 424, which is obtained when the voltage levels of the reception signals R+ and R− become the same in the comparator 421, becomes equivalent to a value corresponding to the voltage change of the reception signal R− by the touch operation. Therefore, the capacitance set value of the measurement capacitance unit 424 is changed while monitoring the output of the comparator 421, and the capacitance set value at which the voltages of the reception signals R+ and R− become the same in the active period is detected. Then, the detected capacitance set value can be used as the RAW value as the touch operation sensing information.

Figure 5B:
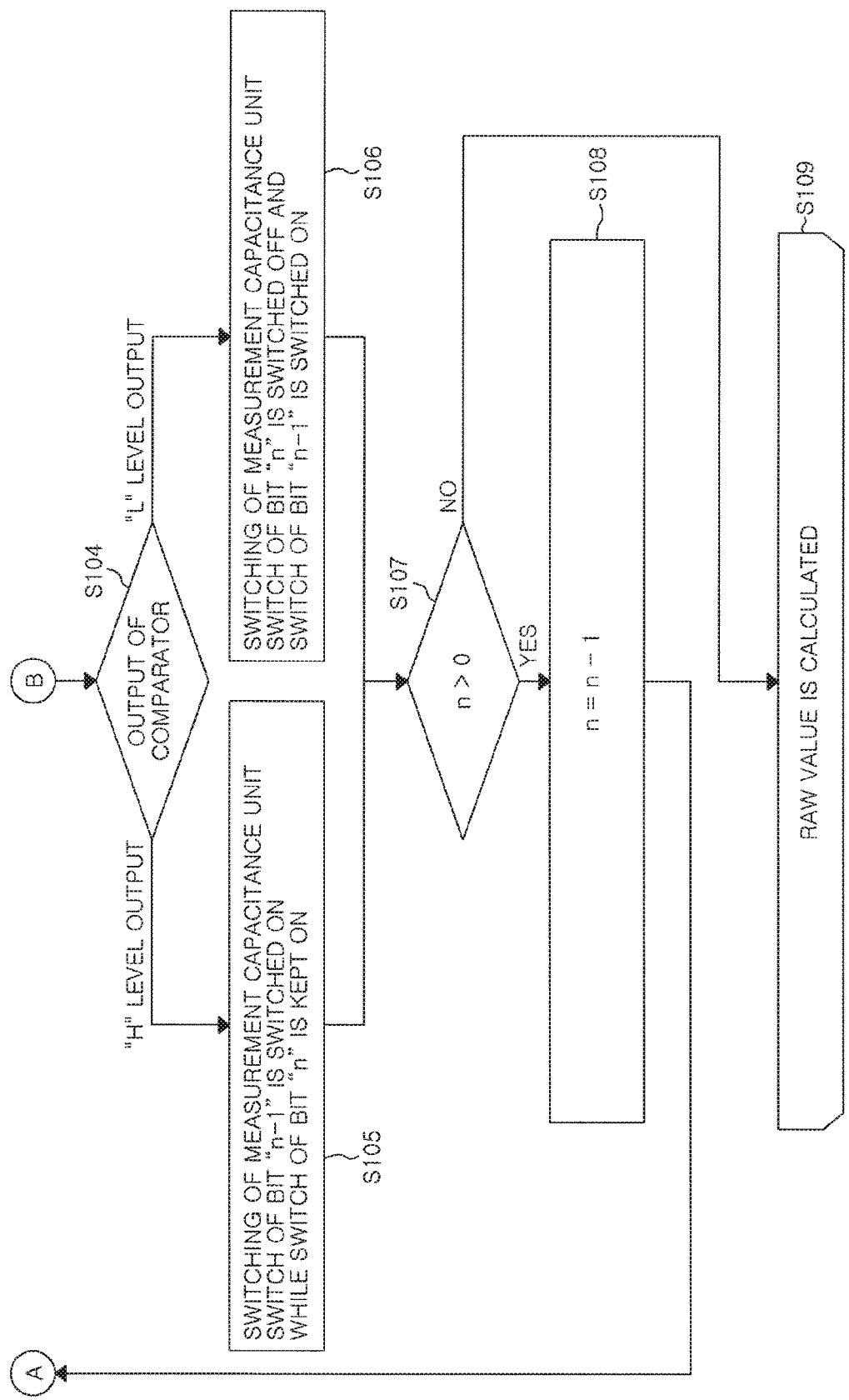

A specific sequence of the above sensing operation will be described with reference to FIGS. 5A and 5B. FIGS. 5A and 5B show processes performed by the transmission circuit 41 and the reception circuit 42 based on various setting information stored in the interface/register circuit 44 by the MCU 5. In FIGS. 5A and 5B, the loop process from steps S100 to S109 shows a sensing procedure for one cell (a set of two transmission signal lines 21 and two reception signal lines 22). The capacitance set value is changed to eight different values (changed seven times from the initial state) until the RAW value is obtained.

In step S100, first, a variable n is set to 7 as an initial value. The reception circuit 42 sets a capacitance value of the measurement capacitance unit 424 to 256 fF based on the instruction of the MCU 5 (capacitance set value). In other words, when the capacitance set value becomes 128 (i.e., 10000000) and only the bit "7" is "1", only the switch SW7 is switched on.

In step S101, the idle period is set. In the transmission circuit 41, the transmission signal T+ from the driver 411 is set to the L level and the transmission signal T− from the driver 412 is set to the H level (i.e., driving voltage AVCC1). In the reception circuit 42, each of the switches 423 and 425 is connected to the terminal Ti. Accordingly, the non-inverting input terminal and the inverting input terminal of the comparator 421 are grounded.

Next, in step S102, the idle period is switched to the active period as a predetermined period of time elapses. In the transmission circuit 41, the transmission signal T+ from the driver 411 is set to the H level (i.e., driving voltage AVCC1) and the transmission signal T− from the driver 412 is set to the L level. In the reception circuit 42, each of the switches 423 and 425 is connected to the terminal Ta. Accordingly, the non-inverting input terminal of the comparator 421 is connected to the driving voltage AVCC2 through the reference capacitance unit 422, and the inverting input terminal of the comparator 421 is connected to the driving voltage AVCC2 through the measurement capacitance unit 424.

In the active period, the reception signals R+ and R− rise by ΔV. Since, however, the transmission signal T+ rises and the transmission signal T− falls, the increase amount of the reception signal R− is changed (to ΔVH or ΔVL) depending on the touch position or whether or not the cell that is being detected has been touched. In step S103, the comparator 421 compares the reception signals R+ and R− and outputs the comparison result. When the condition "(reception signal R+)>(reception signal R−)" is satisfied, the H level output is obtained from the comparator 421. When the condition "(reception signal R+)<(reception signal R−)" is satisfied, the L level output is obtained from the comparator 421.

The process proceeds to different steps S105 and S106 from step S104 based on the output of the comparator 421.

If the H level is outputted from the comparator 421, the capacitance switching in the measurement capacitance unit 424 is performed in step S105. In this case, the switch of bit "n−1" is switched on in a state where the switch of bit "n" is in an ON state. When the capacitance set value is "10000000" in the initial state and only the switch of bit "7" is switched on as described above, the capacitance set value becomes "11000000" and the switch of bit "7" and the switch of bit "6" are switched on. In other words, the switches SW7 and SW6 are switched on, and the capacitance value of the measurement capacitance unit 424 becomes 384 fF. If the condition "n>0" is satisfied in step S107, the variable n is decreased in step S108 and the process returns to step S101. In other words, after the capacitance of the measurement capacitance unit 424 is increased, the operations in the idle period and the active period are performed to monitor the output of the comparator 421.

If the L level is outputted from the comparator 421 in step S104, the capacitance switching in the measurement capacitance unit 424 is performed in step S106. In this case, the switch of bit "n" is switched off and the switch of bit "n−1" is switched on. When the capacitance set value is "10000000" in the initial state and only the switch of bit "7" is switched on, the capacitance set value becomes "01000000" and the switch of bit "7" is switched off and the switch of bit "6" is switched on. In other words, the switch SW7 is switched off and the switch SW6 is switched on, and the capacitance value of the measurement capacitance unit 424 becomes 128 fF. If the condition "n>0" is satisfied in step S107, the variable n is decreased in step S108 and the process returns to step S101. In other words, after the capacitance of the measurement capacitance unit 424 is decreased, the operations in the idle period and the active period are performed to monitor the output of the comparator 421.

By performing the above processes until the condition "n=0" is satisfied, the capacitance set value obtained when the voltage value of the reception signal R− in the active period and that of the reception signal R+ in the active period are balanced is determined. When the condition "n=0" is satisfied, the bit "n−1" does not exist in steps S105 and S106, and, thus, the process of the bit "n−1" is not performed. If the condition "n=0" is satisfied in step S107, the process proceeds to step S109, and the reception circuit 42 calculates the RAW value. This is a process of obtaining the sum of powers of 2 with respect to the bits of the switches SW switched on in the measurement capacitance unit 424. For example, if the switches SW5, SW3, and SW2 are finally switched on, the RAW value is equal to '44' based on the calculation of '$2^5+2^3+2^2=44$'.

The MCU 5 acquires the RAW value thus obtained as the detection value of one cell through the interface/register circuit 44. Similarly, the process shown in FIGS. 5A and 5B is performed on each cell (a set of two transmission signal lines 21 and two reception signal lines 22) on the touch panel 2 to obtain the RAW value for each cell. The MCU 5 acquires the RAW value for each cell, calculates the coordinates of the touch position, and transmits the coordinates to the product-side MCU 90.

In the embodiment, the difference between the reception signals R+ and R− is obtained by the sensing operation described above. Thus, the obtained RAW value is not affected by the external environment, which makes it possible to improve the detection accuracy of the touch operation. Especially in the non-touch state, the potentials of the reception signals R+ and R− are balanced, and the difference in the potentials of the reception signals R+ and R− is generated by the capacitance change caused by the touch operation. The capacitance value of the measurement capacitance unit 424 is sequentially changed to detect a capacitance value at which the reception signals R+ and R− are balanced, and the RAW value is obtained from the capacitance set value specifying the capacitance value.

Accordingly, it possible to accurately detect the difference between the reception signals R+ and R− which is generated by the capacitance change caused by the touch operation.

There are two main reasons why the selected reception signal line 22 is charged by applying the driving voltage AVCC2 from the reception circuit 42. First, it is because the touch panel 2 may have a single layer structure. In the case of the single layer structure, there is substantially no capacitance between the transmission signal line 21 and the reception signal line 22 in a non-touch state. In other words, the insulation state is maintained between the transmission signal line 21 and the reception signal line 22 (between the electrodes). However, even in the non-touch state, the reception signal waveform needs to rise during the active period. Therefore, the driving voltage AVCC2 is transmitted to perform a satisfactory sensing operation even in the case of the single layer structure. The other reason is that the touch panel 2 may not be limited to the single layer structure. In the above sensing operation, the degree of potential increase of the reception signal R− is monitored from the transition to the active period. However, the influence of the fall of the transmission signal T− may need to be monitored. In other words, the potential increase ΔVL indicated by a broken line in FIG. 3 needs to be observed. If the fall of the transmission signal T− occurs in a state where the potentials of the reception signals R+ and R− in the non-touch state during the active period are 0 V, the potential of the reception signal R− becomes a negative value smaller than 0 V, which is difficult to be dealt with in the reception circuit 42. Therefore, the potential of the reception signal R− is maintained at a level higher than 0 V, and the driving voltage AVCC2 is applied to easily and appropriately observe the potential change of the reception waveform affected by the fall of the transmission signal T−.

In the first embodiment, the noise filters 46a and 46b are provided (inserted) in the reception signal lines 23a and 23b, respectively. Therefore, the external electromagnetic noise components on the reception signals R+ and R− can be reduced, which makes it possible to reduce false touch and realize a touch panel device having high sensing accuracy. In the sensing operation, the difference detection scheme is performed with the comparator 421 as described above. In this case, since the resistors R having the same resistance values and the capacitors C having the same capacitance values are used for both of the reception signal lines 23a and 23b, the influence due to the addition of the capacitance is the same in the reception signal lines 23a and 23b. Accordingly, in the case of the difference detection scheme, it is possible to reduce the noise without affecting the detection accuracy.

3. Second Embodiment

A second embodiment will be described with reference to FIGS. 6 and 7.

Figure 6:
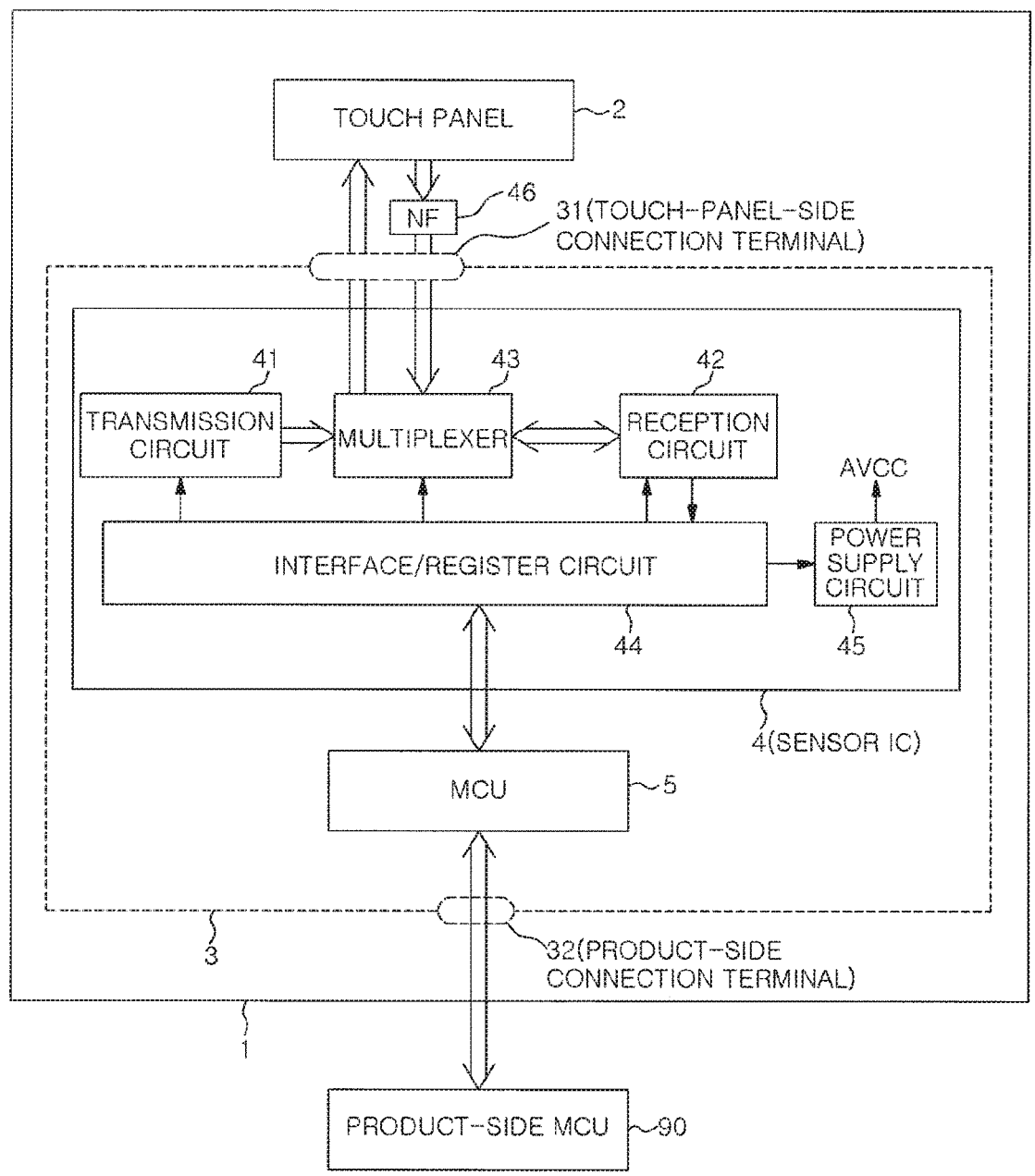
FIG. 6 is a block diagram of a touch panel device according to a second embodiment.

Similar to FIG. 1, FIG. 6 shows a configuration example of the touch panel device 1. In the example shown in FIG. 6, the noise filter 46 is disposed outside the touch panel driving device 3.

Figure 7:
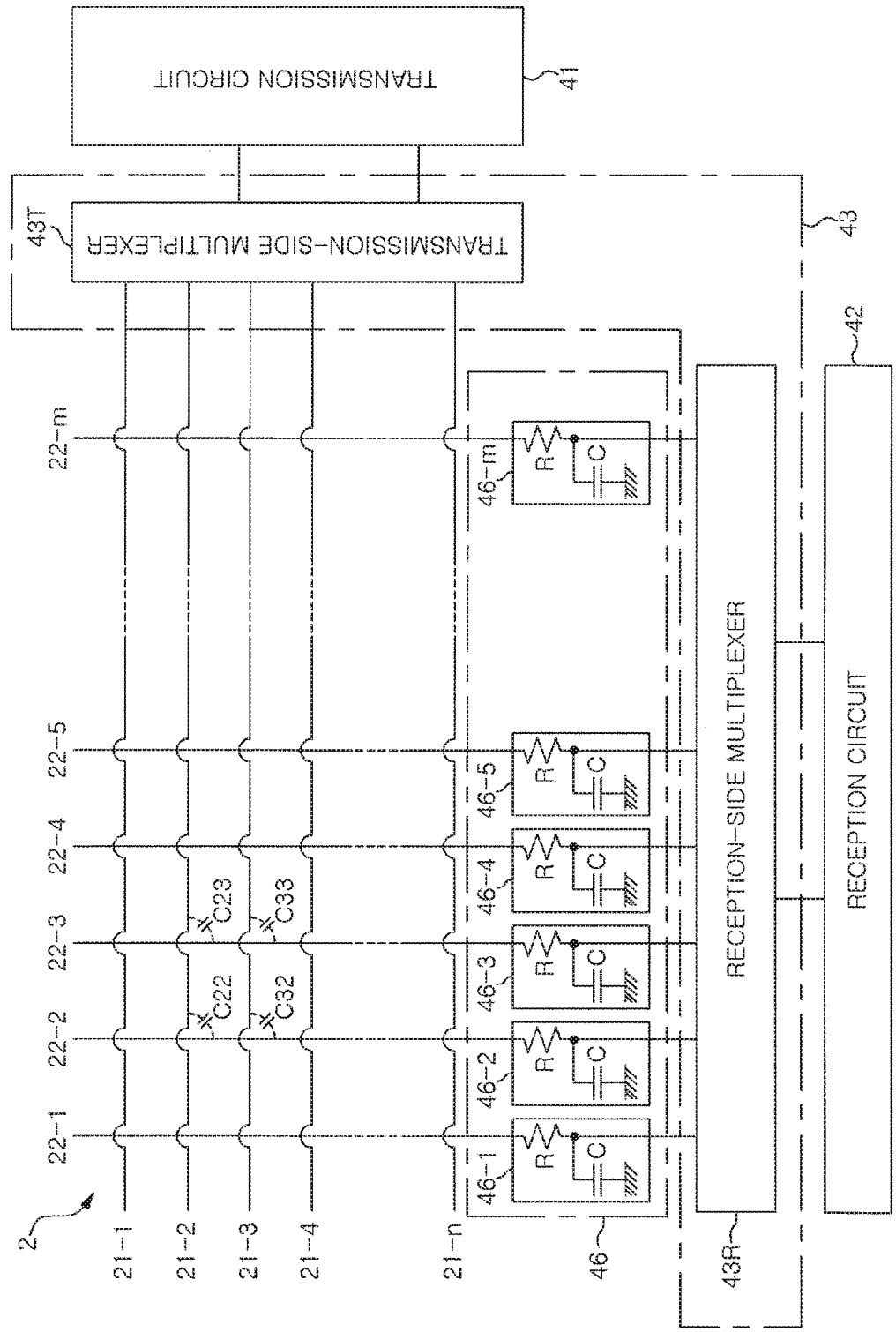
FIG. 7 shows an arrangement of noise filters according to the second embodiment.

Similar to FIG. 2, FIG. 7 schematically shows a connection state of the transmission circuit 41, the reception circuit 42, the multiplexer 43, the noise filter 46, and the touch panel 2.

As can be seen from FIG. 7, the noise filter 46 includes the noise filters 46-1 to 46-m, and the noise filters 46-1 to 46-m are provided in the reception signal lines 22-1 to 22-m in the touch panel 2, respectively while each serving as the LPF using the resistor R and the capacitor C.

By providing the noise filter 46 for each of the reception signal lines 22-1 to 22-m, the external electromagnetic noise components on the reception signals R+ and R− can be reduced as described in the first embodiment and, thus, a touch panel device having high sensing accuracy can be realized. Particularly, in this case, it is possible to individually control the reception signal lines 22-1 to 22-m. For example, the reception signal lines 22-1 to 22-m may have different line lengths or line widths depending on the shape of the touch panel 2, the wiring layout, or the like. This may result in a difference in the wiring resistances. By providing the noise filter 46 for each of the reception signal lines 22-1 to 22-m as shown in FIG. 7, the difference between the signal lines can be absorbed, and the filtering operation of the same filtering characteristics can be performed.

With such configuration, the noise filter 46 may be provided at the touch panel 2 side and, thus, it is possible to use a conventional sensor IC having no noise filter 46. In the first embodiment, in the case that the noise filter 46 is provided in the sensor IC 4, the noise filter 46 is provided in the reception signal lines 23a and 23b. However, the noise filter 46 may also be provided in each of the m-number of reception signal lines 22-1 to 22-m between the touch-panel-side connection terminal 31 and the multiplexer 43 in FIG. 6. In other words, even when the noise filter 46 is provided in the sensor IC 46, the noise filter 46 may be provided in each of the reception signal lines 22-1 to 22-m.

4. Third Embodiment

Figure 8:
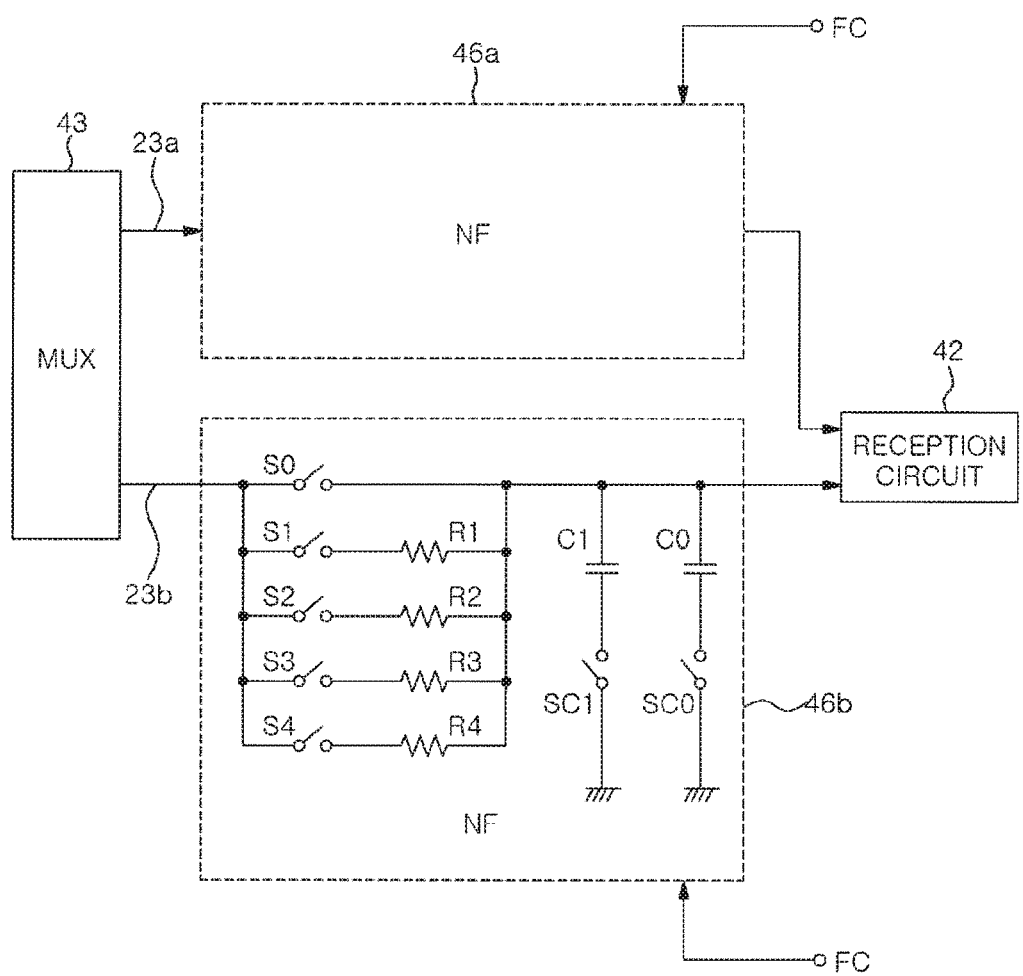
FIG. 8 shows a configuration of a noise filter according to a third embodiment.

Hereinafter, there will be described a third embodiment showing an example in which the filtering characteristics of the noise filter 46 are variable. FIG. 8 shows a configuration example of the noise filter 46 in which the filtering characteristics are variable. FIG. 8 shows an example in which the noise filters 46a and 46b are provided in the reception signal lines 23a and 23b between the multiplexer 43 and the reception circuit 42 as in the first embodiment.

The noise filters 46a and 46b have the same configuration. FIG. 8 shows the configuration of the noise filter 46b. Therefore, the noise filter 46b will be mainly described.

The noise filter 46b includes resistors R1, R2, R3, and R4, capacitors C0 and C1, and switches S0, S1, S2, S3, S4, SC0, and SC1.

The switch S0 is provided to bypass the filter in the reception signal line 23b. The switches S1 to S4 are used to select the resistors R1 to R4, respectively. When one of the switches S0, S1, S2, S3 and S4 is switched on, the resistance value applied in the reception signal line 23b is selected. The switches SC0 and SC1 are used to select the capacitors C0 and C1, respectively. With this configuration, the noise filter 46b can select the resistance value defining the characteristics of the LPF among the resistance values of the resistors R1, R2, R3, and R4, and also can select the capacitance among the capacitance values of the capacitors C0 and C1. For example, the resistor R1 has a resistance value of 5 KΩ; the resistor R2 has a resistance value of 10 KΩ; the resistor R3 has a resistance value of 20 KΩ; and the resistor R4 has a resistance value of 50 KΩ. The capacitance C0 has a capacitance value of 2 pF, and the capacitance C1 has a capacitance value of 10 pF.

The switches S0, S1, S2, S3, S4, SC0 and SC1 are switched on and off by a control signal FC based on a set value stored in the interface/register circuit 44. FIG. 9 shows an example of the set values. The set values for controlling the noise filters 46 (46a and 46b) are expressed by 4 bits of "LPFEN", "LPFR[1]", "LPFR[0]" and "LPFC". They are included in 1-byte command stored in a predetermined address of the interface/register circuit 44. FIG. 9 shows a filter setting and an internal setting corresponding to the respective bit values. The filter setting indicates a resistance value and a capacitance value for the noise filter 46. The internal setting indicates on/off states of the switches S0, S1, S2, S3, S4, SC0 and SC1.

The "LPFEN" bit indicates enable. When "LPFEN" is 0, the switch S0 is turned on, and the other switches S1, S2, S3, S4, SC0, and SC1 are turned off. Therefore, the resistors R1 to R4 are bypassed, and the capacitors C0 and C1 are opened. Accordingly, the noise filter 46 is turned off and the filter operation is not performed.

When "LPFEN" is 1, the switches S1, S2, S3 and S4 are controlled by two bits of "LPFR[1]" and "LPFR[0]", and the switches SC0 and SC1 are controlled by "LPFC". When the two bits of "LPFR[1]" and "LPFR[0]" are "00", the switch S1 is turned on; the switches S0, S2, S3 and S4 are turned off; the resistor R1 is selected; and the resistance value becomes 5 KΩ. When the two bits of "LPFR[1]" and "LPFR[0]" are "01", the switch S2 is turned on; the switches S0, S1, S3 and S4 are turned off; the resistor R2 is selected; and the resistance value becomes 10 KΩ. When the two bits of "LPFR[1]" and "LPFR[0]" are "10", the switch S3 is turned on; the switches S0, S1, S2 and S4 are turned off; the resistor R3 is selected; and the resistance value becomes 20 KΩ.

When the two bits of "LPFR[1]" and "LPFR[0]" are "11", the switch S4 is turned on; the switches S0, S1, S2 and S3 are turned off; the resistor R4 is selected; and the resistance value becomes 50 KΩ.

When "LPFC" bit is "0", the switch SC0 is turned on; the switch SC1 is turned off; the capacitor C0 is selected; and the capacitance value becomes 2 pF.

When "LPFC" bit is "1", the switch SC1 is turned on; the switch SC0 is turned off; the capacitor C1 is selected; and the capacitance value becomes 10 pF.

Since the filtering characteristics of the noise filter 46 are variable, it is possible to set appropriate filtering characteristics depending on the touch panel 2 connected to the touch panel driving device 2 or the environment in which the touch panel is used.

The noise filters 46a and 46b operate with the same filtering characteristics. Therefore, the same set values are applied to both of the noise filters 46a and 46b.

Figure 10:
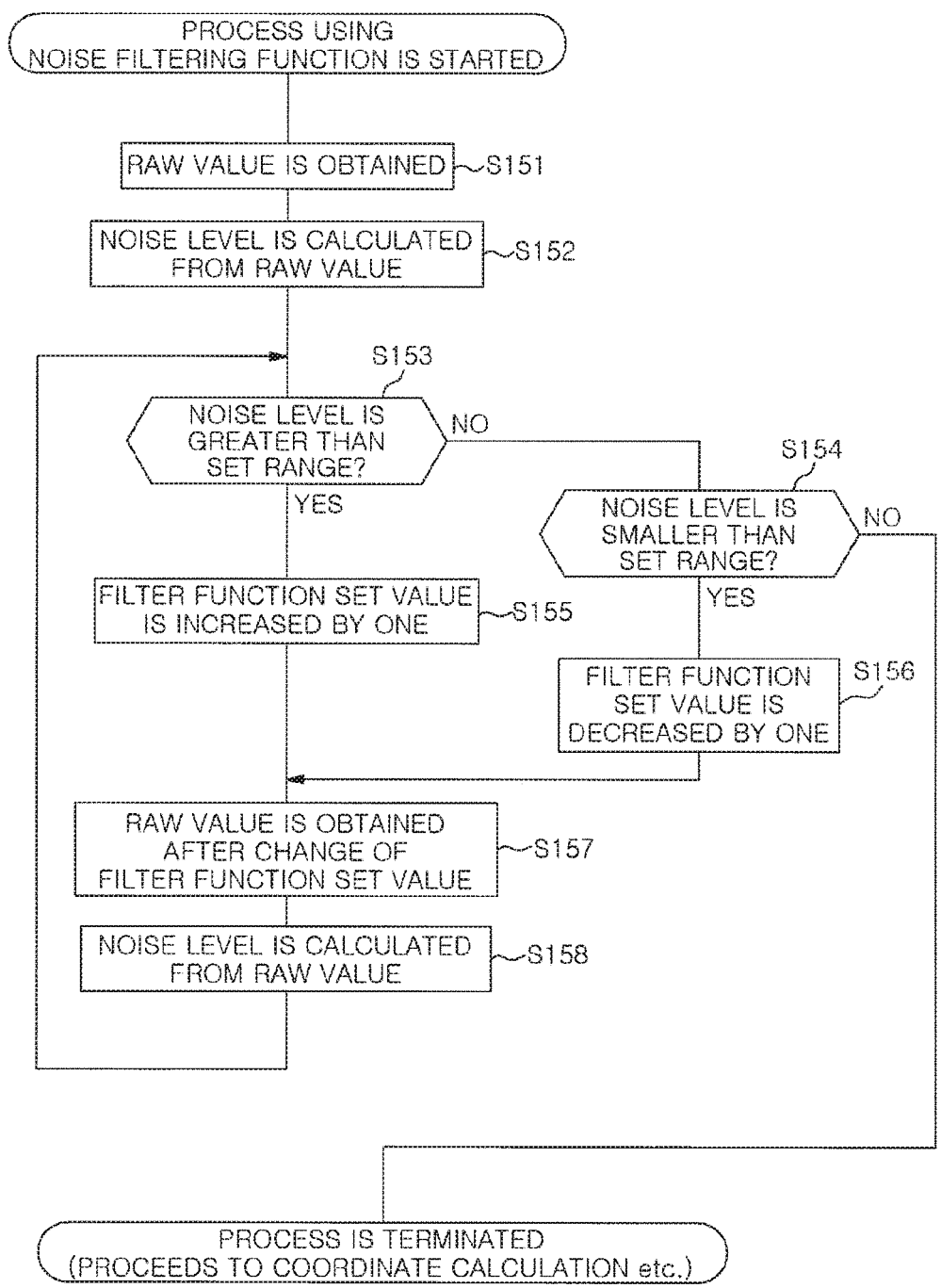
FIG. 10 is a flowchart of a control of the noise filter according to the third embodiment.

In the case of adopting the configuration in which the filtering characteristics are variable, the filtering characteristics may be controlled by the process shown in FIG. 10, for example. FIG. 10 shows the process of controlling the noise filter 46 by the MCU 5, for example. A processor for performing such control may be provided in the sensor IC 4. After the process using the noise filtering function is started, the MCU 5 (or the processor in the sensor IC 4) performs the process shown in FIG. 10 whenever the RAW value is obtained, for example.

When the RAW value is obtained in step S151, the MCU 5 calculates the noise level from the currently obtained RAW value in step S152. The noise level can be calculated as the change amount of the RAW value of the same cell in the previous frame. Alternatively, the noise level may be obtained as the integrated change amount of the RAW value.

Figure 12A:
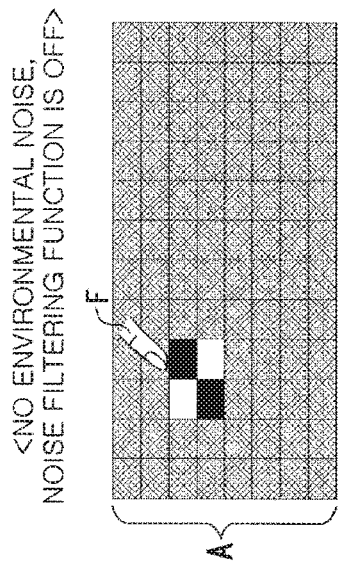
FIGS. 12A to 12C each of which shows a noise level calculation according to the third embodiment.

The integrated change amount of the RAW value will be described with reference to FIGS. 12A to 12C. FIG. 12A shows an example of the RAW value obtained in each detection position in the case where there is no environmental noise. The RAW value of each cell is indicated by shading on the left side, and the change amount of the RAW value is shown on the right side. The RAW value ranges from "1" to "255". The change amount ranges from "−127" to "127" on the assumption that the center value "128" of the RAW value is "0".

In a position touched by a finger F, the change amounts of the RAW values of corresponding four cells are "127", "−127", "127", and "−127". The RAW values of the other cells are "0". As a result, the integrated change amount of the RAW values of all the cells is "0".

Figure 12B:
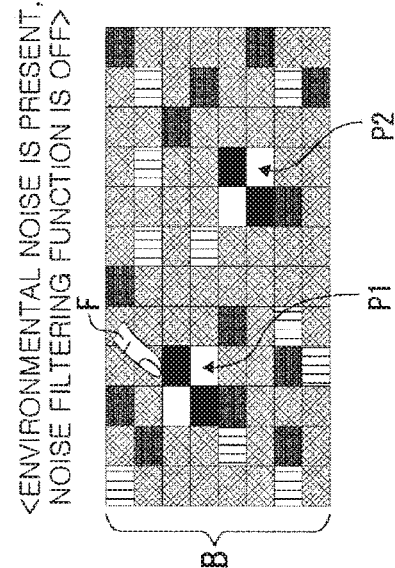

FIG. 12B shows the case where there is an environmental noise. In this case, there is another position where the RAW value changes due to a high frequency noise, in addition to the position touched by the finger F. In other words, the integrated change amount of all the RAW values is increased to "+" side or decreased to "−" side. The integrated change amount becomes far from "0" as the noise level becomes higher.

In the process shown in FIG. 10, the noise level is determined under the above described circumstance, for example.

The calculated noise level is compared with a predetermined set range. The set range may be a range in which the noise level is determined to be appropriate (sensing is not affected). If the noise level is greater than the set range, the process proceeds from step S153 to step S155 by the MCU 5 and increases a filter function set value by one. On the other hand, if the noise level is smaller than the set range, the process proceeds from step S154 to step S156 by the MCU 5 and decreases the filter function set value by one.

The filter function set value indicates a type of filter setting as shown in FIG. 11, for example. In this example, 9 levels from "0" to "8" are set as the filter function set values. The filter function set value "0" indicates that the noise filter is off. The filter function set values "1" to "8" indicate that the noise filters of different filtering characteristics or different resistance and capacitance values of the resistors and the capacitors are turned on. In the example of FIG. 11, as the filter function set value becomes greater, the cut-off frequency of the LPF becomes lower so that the filter function becomes enhanced. As such, in steps S155 and S156 of FIG. 10, the filter function set value is increased or decreased so that the filtering characteristics are switched.

The set value (register value) indicates a value of a 1-byte (8-bit) command stored in a predetermined address of the interface/register circuit 44. The 8-bit command includes bits of "RSV", "RSV", "RSV", "RSV", "LPFC", "LPFR[1]", "LPFR[0]", and "LPFEN" ("RSV" indicates reserve) from MSB. "0x" indicates hexadecimal representation. For example, the register value "0x01" of the filter function set value "1" is "00000001", which indicates that "LPFC" is 0; "LPFR[1]" is 0; "LPFR[0]" is 0; and "LPFEN" is 1. This corresponds to the case where the resistor R1 of 5 KΩ and the capacitor C0 of 2 pF are selected in FIG. 9.

In step S157 of FIG. 10, the MCU 5 obtains the RAW value after the change of the filter function set value. Then, in step S158, the MCU 5 calculates the noise level from the RAW value in the above-described manner. Then, the determination processes in steps S153 and S154 are performed.

The MCU5 terminates the process shown in FIG. 10 when "NO" in both of steps S153 and S154, i.e., when the noise level is within the set range.

In other words, in the process shown in FIG. 10, the filter function set value is controlled to be increased or decreased so that the noise level can be within the set range. Then, the process shown in FIG. 10 is terminated when the noise level is within the set range. Thereafter, the noise filtering operation is performed using the filter function set value thus controlled. By performing such control, it is possible to remove unwanted noise level while minimizing the deterioration in the responsiveness of the reception signals R+ and R− caused by the insertion of the noise filter 46. In the example of FIG. 11, the set values "5" and "6" have the same cut-off frequency and, thus, it is preferable to switch (change) the filter function set values in eight steps, excluding one of them.

5. Fourth Embodiment

Hereinafter, a fourth embodiment will be described. Similar to the third embodiment, the configuration in which the noise filter 46 has variable filtering characteristics is employed in the fourth embodiment.

As described above, FIG. 12A shows the case where there is no environmental noise. In this case, there is no error when the noise filtering function is turned off since the RAW values in the positions other than the touch position are not changed as shown in FIG. 12A. However, when there is the environmental noise and the noise filtering function is turned off, a position where the RAW value is changed other than the touch position is generated, as can be seen from FIG. 12B. Particularly, if the same change amount of the RAW value as that in the position P1 touched by the finger F is generated in a position P2, it may be detected as false touch.

Figure 12C:
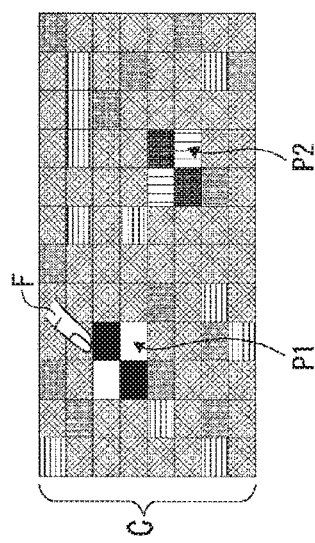

The noise generation shown in FIG. 12B can be reduced to that shown in FIG. 12C by turning on the noise filtering function. In other words, although there is additional position where the RAW value is changed due to the noise other than the touch position P1, the change amount of the RAW value in that position is decreased as the high frequency noise is attenuated. For example, the change amount of the RAW value in the position P2 becomes smaller than that in the touch position P1. Accordingly, the S/N ratio is improved and errors are difficult to be detected. As for the integrated change amount, the integrated change amount of all the RAW values in the state of FIG. 12C becomes closer to zero, compared to that in the state of FIG. 12B.

Here, when there is no environmental noise, e.g., as shown in FIG. 12A, the noise filtering function disturbs the rise of the reception signals R+ and R−, which may be disadvantageous in the detection operation. On the other hand, when there is an environmental noise, the reduction of the high frequency noise using the noise filtering function leads to the improvement of the sensing accuracy as shown in FIG. 12C. Therefore, in the fourth embodiment, the noise filtering function is turned off in the initial state. Then, the noise filtering function is turned on when necessary.

Figure 13:
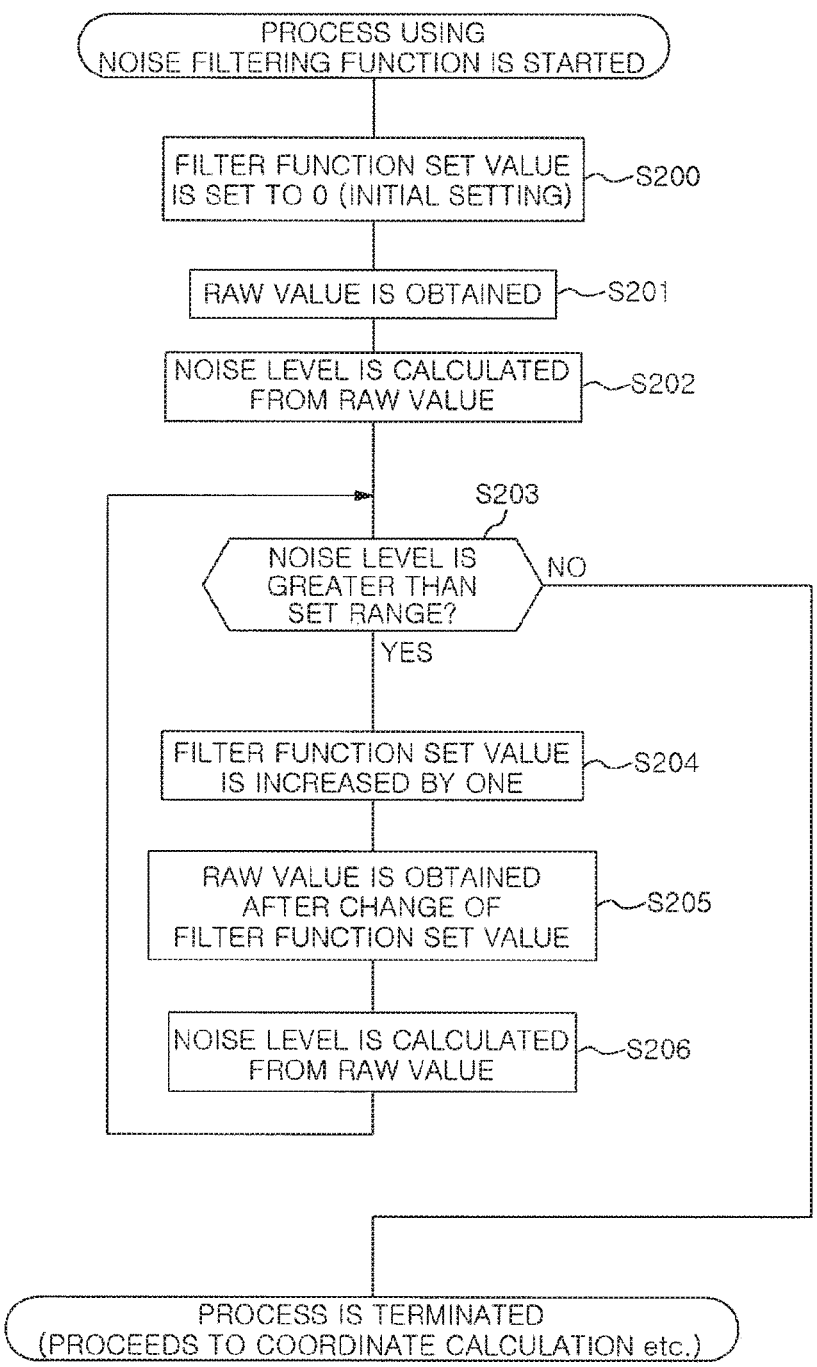
FIG. 13 is a flowchart of a control of a noise filter according to a fourth embodiment.

For example, the MCU 5 (or the processor in the sensor IC 4) performs the process shown in FIG. 13. In step S200, the MCU 5 sets the filter function set value to 0. In other words, the noise filtering function is turned off in the initial state.

When the RAW value is obtained in step S201, the MCU 5 calculates the noise level from the current RAW value in step S202 (similarly to steps S151 and S152 of FIG. 10). Then, in step S203, the MCU 5 determines whether or not the calculated noise level is greater than a certain set range. If the noise level is greater than the set range, the process proceeds from step S203 to step S204 by the MCU 5 and increases the filter function set value by one (see FIG. 11). In other words, the filter function set value is increased by 1 from the initial value, and the noise filtering function is executed in a state where the filter function set value is 1.

In step S205, the MCU 5 obtains the RAW value after the change of the filter function set value. Then, in step S206, the MCU 5 calculates the noise level from the RAW value in the above-described manner. Then, in step S203, it is determined whether or not the calculated noise level is greater than the certain set range. The filter function set value is increased by 1 until it is determined that the noise level is within the set range. In other words, the cut-off frequency of the LPF is gradually lowered to enhance the filter function.

If "NO" in step S203, i.e., the noise level is within the set range, the process shown in FIG. 13 is terminated. In other words, in the process shown in FIG. 13, the filter function is enhanced from the filter-function off-state only in a desired step depending on the noise level. Therefore, in a noiseless environment, the sensing is performed in the initial stage in which the noise filtering function is turned off. In a slight noise environment, a comparable noise filtering function is obtained. In a large noise environment, a powerful noise filtering function is obtained. By performing such control, it is possible to remove unwanted noise level while minimizing the deterioration in the responsiveness of the reception signals R+ and R− caused by the insertion of the noise filter 46.

6. Fifth Embodiment

Hereinafter, a fifth embodiment will be described with reference to FIGS. 14A to 15. The fifth embodiment shows an example in which the elements (i.e., resistors and capacitors) of the noise filter 46 are variably controlled depending on the scanning timing of the transmission signal line 21 or the reception signal line 22 on the touch panel 2.

Figure 14A:
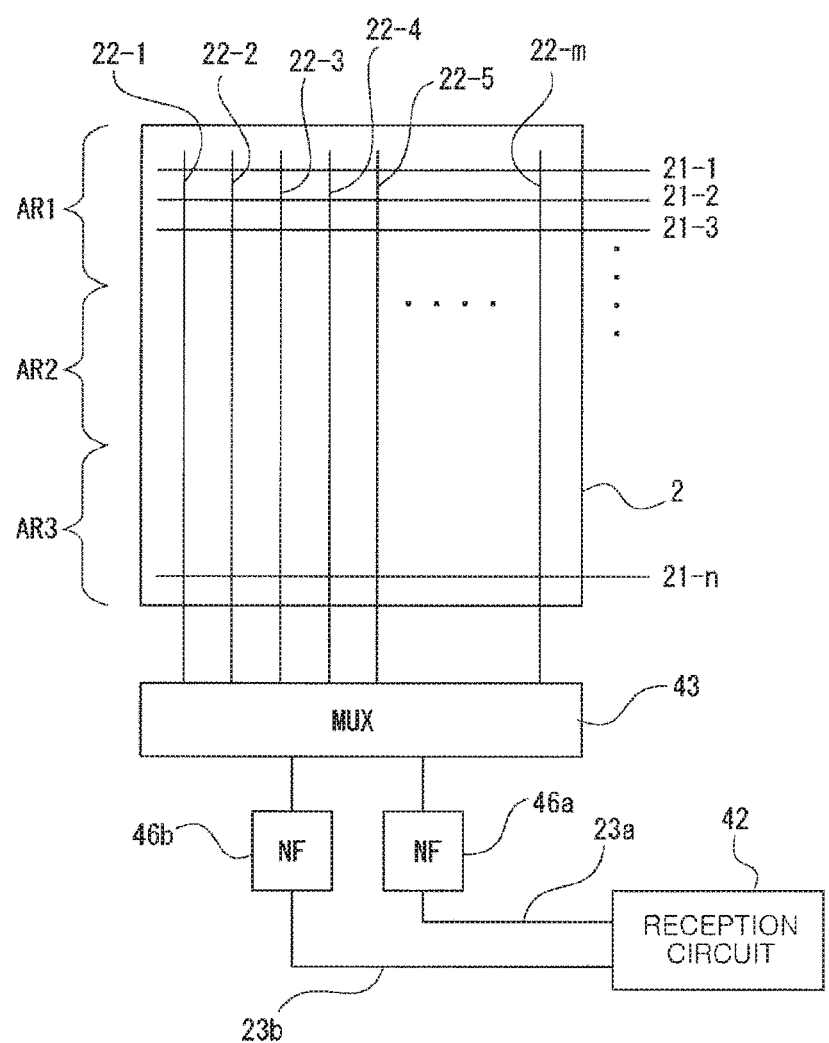
FIGS. 14A and 14B each of which shows a configuration of a fifth embodiment.

FIG. 14A schematically shows the rectangular touch panel 2, the transmission signal lines 21-1 to 21-$n$, and the reception signal lines 22-1 to 22-$m$. As described above, the scanning is performed to sequentially select a pair of transmission signal lines among the transmission signal lines 21-1 to 21-$n$. Areas AR1, AR2 and AR3 are set as the scanning lines from a side far from the multiplexer 43 to a side close to the multiplexer 43.

In the case of scanning the area AR1, the wiring lengths of the reception signal lines 22-1 to 22-$m$ is long from the touch position to the noise filter 46. In the case of scanning the area AR3, the wiring lengths of the reception signal lines 22-1 to 22-$m$ is short from the touch position to the noise filter 46. In other words, the wiring resistance that affects the filter operation is changed within one frame period. Therefore, a plurality of resistors can be selected as shown in FIG. 8, for example. Here, resistors having three types of resistance values can be selected depending on the areas AR1, AR2, and AR3. Then, the resistors are switched depending on the scanning lines. In this case, the resistance values of the resistors are used for absorbing the difference in the wiring resistances.

Figure 15:
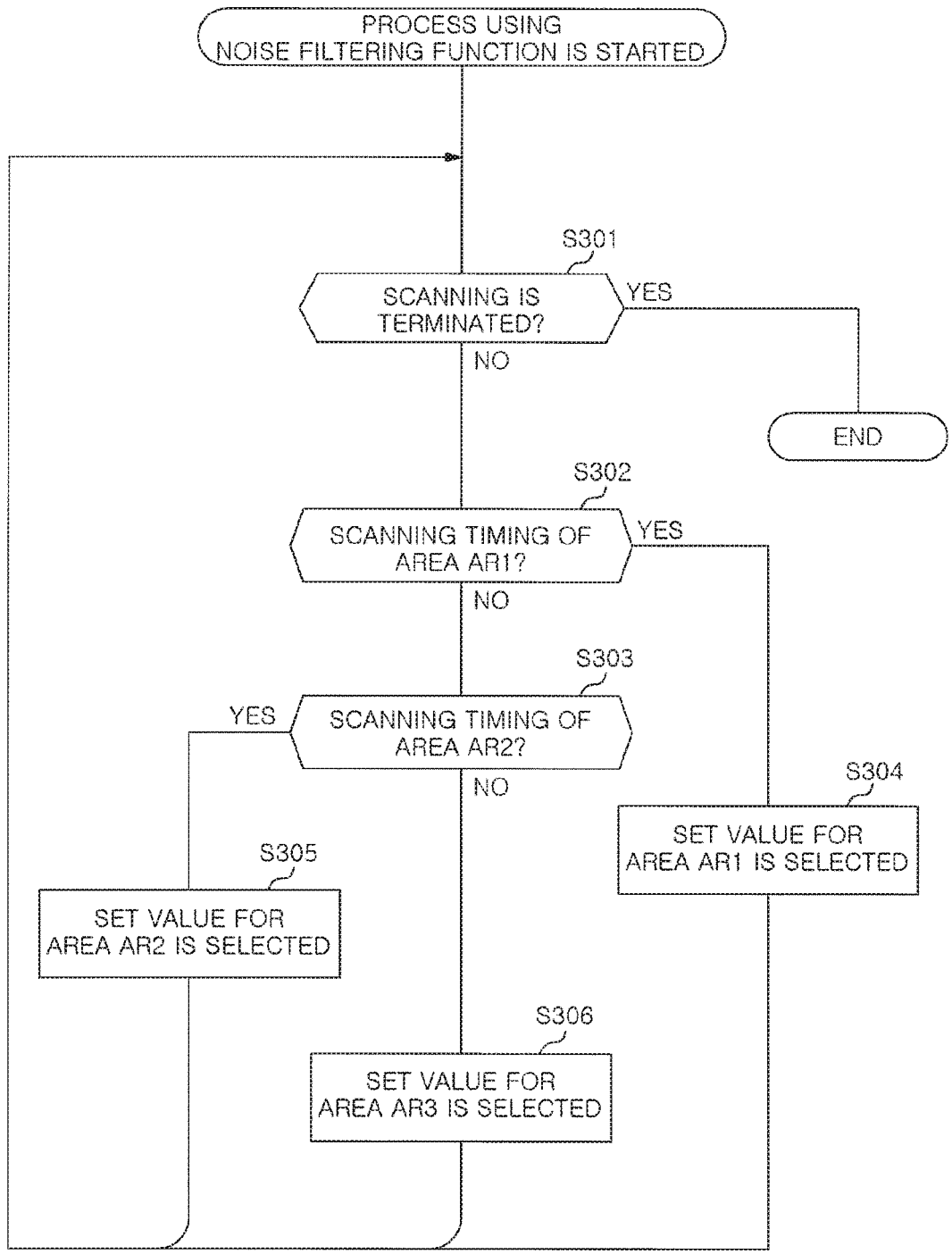
FIG. 15 is a flowchart of a control of a noise filter according to the fifth embodiment.

The MCU 5 (or the processor in the sensor IC 4) repeats the process shown in FIG. 15 during the scanning, i.e., during the sensing operation of the touch panel 2. In step S301, the MCU 5 monitors the termination of the scanning.

If the scanning is not terminated, it is determined in step S302 whether or not the current timing is the scanning timing in the area AR1. If it is determined that the current timing is the scanning timing in the area AR1, the process proceeds to step S304 to select a set value for the area AR1. In this case, the set value is used for selecting a resistor, for example. If the current timing is not the scanning timing in the area AR1, the process proceeds to step S303 by the MCU 5 to determine whether or not the current timing is the scanning timing in the area AR2. If it is determined that the current timing is the scanning timing in the area AR2, the process proceeds to step S305 to select a set value for the area AR2. If the current timing is not the scanning timing in the area AR2, it is determined that the current timing is the scan timing in the area AR3. Therefore, the process proceeds to step S306 to select a set value for the area AR3.

For example, by switching and controlling the resistance values within one frame period, it is possible to perform the filtering operation of absorbing the difference in the wiring resistances caused by the scanning lines. The areas are not limited to three areas AR1 to AR3 described above, and may be two areas or more than three areas.

This process is performed in response to the changes in the wiring resistances of the reception signal lines 22-1 to 22-*m* depending on the scanning areas, and thus is particularly effective in the case where the reception signal line 22 is considerably long. In the fifth embodiment, the filtering operation of the same filtering characteristics due to the same resistance and capacitance values of the resistors R and the capacitors C is performed on the reception signals R+ and R− of the pair of reception signal lines 22 selected by the reception-side multiplexer 43R, similar to the first embodiment to the fourth embodiment. In addition, in the fifth embodiment, the filtering characteristics including the wiring resistances are not changed in the plane of the touch panel 2 (the areas AR1 to AR3) and, thus, uniformity of in-plane filtering characteristics can be obtained.

Figure 14B:
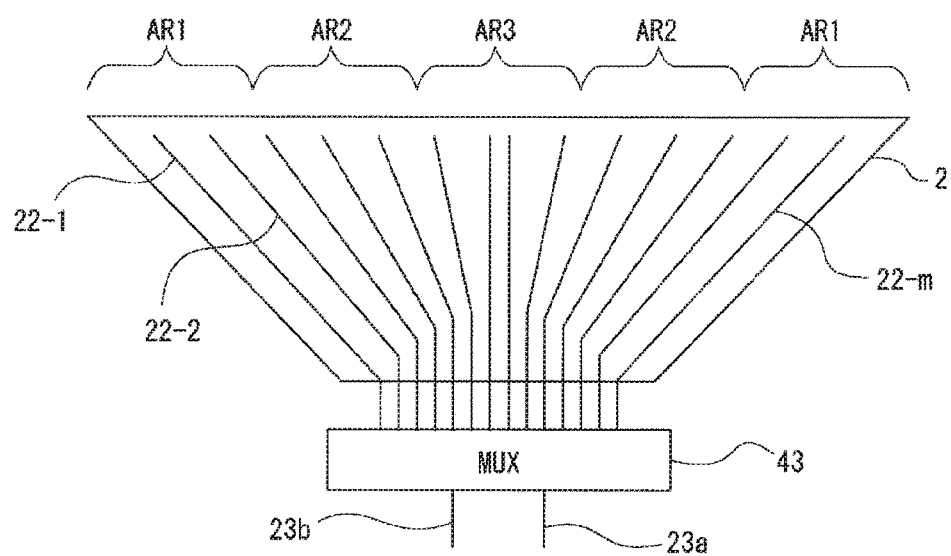

The same process may be performed, taking into account the scanning of the reception signal lines 22-1 to 22-*m*. FIG. 14B shows an example in which the reception signal lines 22-1 to 22-*m* have different wiring lengths due to, e.g., the trapezoidal shape of the touch panel 2. As shown in FIG. 14B, the wiring lengths of the reception signal lines 22-1 to 22-*m* may be considerably different from each other depending on the layout of the reception signal lines 22-1 to 22-*m* or the shape of the touch panel 2. Therefore, as shown in FIG. 14B, the reception signal lines 22-1 to 22-*m* are divided into the areas AR1, AR2, and AR3 depending on the wiring lengths. Then, the resistors may be switched depending on the scanning timing of the reception signal lines 22-1 to 22-*m* (i.e., depending on the selection of a pair of reception signal lines). In this case, the process shown in FIG. 15 is performed. Specifically, the scanning timing in steps S302 and S303 may be the selection timing of the reception signal lines 22-1 to 22-*m*, and an area having the selected pair of reception signal lines 22 may be determined. Accordingly, the filtering process of absorbing the difference in the wiring lengths of the reception signal lines 22-1 to 22-*m* is performed.

Although the switching of the resistance values has been described above, the capacitance values may be switched depending on the scanning area of the transmission signal line 21 or the reception signal line 22.

7. Effect and Modification of the Embodiment

The touch panel device 1 or the touch panel driving device 3 having the above configuration can provide the following effects. The touch panel device 1 or the touch panel driving device 3 according to the embodiment includes: the reception circuit 42 configured to respectively receive the reception signals R+ and R− from the pair of reception signal lines 22 of the touch panel, the reception signals R+ and R− having waveforms that are changed by the capacitance change caused by a touch operation and generate a detection value for detecting the touch operation on the touch panel by comparing the reception signals R+ and R−; and the plurality of noise filters 46 provided in the signal path from the reception signal lines 22 to the reception circuit 42 between the touch panel 2 and the reception circuit 42 and configured to perform the filtering operation of the same filtering characteristics on each of the reception signals R+ and R− supplied from the pair of reception signal lines 22 to the reception circuit 42. By providing the noise filters 46 (e.g., the noise filters 46*a* and 46*b* or the noise filters 46-1 to 46-*m*) for performing the filtering process on the reception signals R+ and R− supplied to the reception circuit 42, the errors caused by the external noise (electromagnetic noise) can be reduced and, further, the sensing accuracy of the touch panel can be improved. Generally, in the capacitance-change detection scheme, it is required to avoid insertion of a capacitive element in the reception signal line. This is because the accuracy in detecting the capacitance change may deteriorate due to the inserted capacitive element. In contrast, in the embodiment, the difference between the reception signals R+ and R− is detected and, thus, the detection accuracy is not affected if the process having the same filtering characteristics is performed on each of the reception signals R+ and R−. In other words, since only the difference is detected, the filter unit 46 as a RC filter circuit can be provided on the reception signal lines 22, which makes it possible to effectively reduce the noise with a simple circuit. Further, since this scheme is not a general method for removing a noise after the signal amplification, there is no amplification of noise components. Further, noise components themselves on the reception signal line 22 can be reduced, which also makes it possible to effectively reduce the noise with a simple configuration.

In the embodiment, each of the noise filters 46 includes the resistors having the same resistance values and the capacitors having the same capacitance values. Accordingly, it is possible to realize each filter as a RC circuit having a simple configuration and perform the filtering operation of the same filtering characteristics. Specifically, it is simplest way that the noise filters 46*a* and 46*b* (or 46-1 to 46-*m*) are configured to include the resistors R having the same resistance value and the capacitors C having the same capacitance value as shown in FIG. 3 of the first embodiment and FIG. 7 of the second embodiment. Further, even when each of the noise filters 46 can select the resistor and the capacitor from the resistors R1 to R4 and the capacitors C0 and C1 as described in the third embodiment, the same resistance values and the same capacitance values of the resistors and the capacitors are applied to both of the noise filters 46*a* and 46*b*, so that the filtering operation of the same filter characteristic can be performed.

In the first embodiment, the touch panel driving device 3 includes the multiplexer 43 (selection circuit) for sequentially selecting and electrically connecting two reception signal lines among the m-number of reception signal lines 22-1 to 22-*m* arranged on the touch panel 2 with two reception signal lines 23*a* and 23*b* provided for supplying the reception signals R+ and R− to the reception circuit 42. The first embodiment has described the example in which the noise filter 46 is provided in the signal path of each of the two reception signal lines 23*a* and 23*b* between the multiplexer 43 and the reception circuit 42. Therefore, only two noise filters may be provided to correspond to the reception signals from a large number (m-number) of the reception signal lines 22, so that the circuit load for the noise filter 46 can be minimized. Accordingly, it is possible to simplify the configuration of the touch panel driving device 3 and reduce the manufacturing cost. Further, by providing the noise filter 46 in the sensor IC 4 as shown in FIG. 1, the circuit scale of the touch panel driving device 3 is not substantially increased.

The third embodiment has described the example in which the noise filter 46 includes a plurality of resistors R1 to R4 having different resistance values and a plurality of capacitors C0 and C1 having different capacitance values and the resistors and the capacitors are switchable. Therefore, the noise filter as the LPF can select the filtering characteristics, i.e., the cut-off frequency. Accordingly, for example, the noise resistance environment and the sensitivity can be appropriately selected. It is also possible to select optimal filtering characteristics depending on the touch panel to be connected. The present disclosure is not limited to the configuration shown in FIG. 8 and may employ a configuration in which a plurality of resistors can be selected while one capacitor is provided, or a configuration in which a plurality of capacitors can be selected while only one resistor is provided. Further, in the example of FIG. 8, it is possible to select that the noise filtering function is turned off by bypassing the resistors with the capacitors being opened. However, it is also possible to employ a configuration example in which turning off of the noise filtering function cannot be selected.

The third and the fourth embodiment have described, as the processes shown in FIG. 10 or 13, the example in which the noise filter 46 switches the resistors R or the capacitors C depending on the noise level detected by the reception circuit 42. For example, when the noise level becomes higher, the errors frequently occur in the detection of the touch position. In this case, the cut-off frequency is lowered by changing the resistance values of the resistors and the capacitance values of the capacitors of the noise filter 46, thereby enhancing the noise removal function. On the other hand, when the noise level is low and the frequency of error occurrence is low, the cut-off frequency is increased or the filter function is turned off. Accordingly, the appropriate noise filtering operation can be performed when necessary. Since the rise of the signal waveforms of the reception signals R+ and R− may be slightly delayed by providing the noise filter as the LPF, it is preferable to turn off the noise filter 46 when it is not necessary. Therefore, it is possible to eliminate unnecessary decrease in the sensitivity of the sensor, which is advantageous in the detection operation. FIGS. 10 and 13 show the example in which the determination is made using the noise level. However, the noise level may be indirectly determined. For example, it is also possible to determine an error rate in the detection and variably control the characteristics of the noise filter 46 based on the determined error rate.

The fifth embodiment has described the configuration in which the noise filter 46 switches the resistors or the capacitors depending on the scanning timing of the reception signal line 22 of the transmission signal line 21 on the touch panel 2.

For example, a plurality of areas AR1 to AR3 is set for the transmission signal line 21 and the reception signal line 22, and elements (i.e., resistors and capacitors) for performing a filtering operation are switched for each area including the scanning targets of the transmission signal line 21 and the reception signal line 22 to be scanned. Therefore, it is possible to perform the filtering operation of absorbing the difference in the resistance components, e.g., due to the different lengths of the signal lines. Accordingly, it is possible to balance the noise resistance environment and the sensitivity in the connected touch panel 2.

The second embodiment has described the example in which the noise filter 46 is provided for each of the m-number of the reception signal lines 22-1 to 22-$m$ arranged on the touch panel 2. In other words, the noise filter as the RC circuit is provided for each of the reception signal lines arranged on the touch panel. Accordingly, it is possible to provide the noise filters for absorbing the characteristic differences (e.g., the difference in the wiring resistances) between the large number (m-number) of reception signal lines 22-1 to 22-$m$. For example, by controlling the resistance values of the noise filters depending on the differences in the wiring lengths of the respective reception signal lines 22-1 to 22-$m$, it is possible to perform the noise filtering operation of the same filtering characteristics on each of the reception signal lines 22-1 to 22-$m$.

The configurations and the operations of the embodiments are merely examples. The present disclosure may have other various configurations and operations.

Particularly, a specific configuration, an arrangement location, and a switching control method of the noise filter 46 may be variously modified.

While the present disclosure has been shown and described with respect to the embodiments, it will be understood by those skilled in the art that various changes and modifications may be made without departing from the scope of the present disclosure as defined in the following claims.

What is claimed is:

1. A touch panel driving device for sequentially performing a scanning of selecting a pair of adjacent transmission signal lines from N number of transmission signal lines and a pair of adjacent reception signal lines from M number of reception signal lines arranged on a touch panel wherein M and N are a natural number of 3 or more, the touch panel driving device comprising:
   a reception circuit configured to respectively receive, from the pair of adjacent reception signal lines of the touch panel, reception signals whose waveforms are changed due to a capacitance change caused by a touch operation and generate a detection value for detecting the touch operation on the touch panel by comparing the reception signals; and
   a plurality of noise filters provided in signal paths from the M number of reception signal lines of the touch panel to the reception circuit and configured to perform a filtering operation of the same filtering characteristics on each of the reception signals supplied to the reception circuit from the pair of adjacent reception signal lines,
   wherein each of the noise filters is configured to have a plurality of resistors having different resistance values and a plurality of capacitors having different capacitance values and switchably select the resistors and/or the capacitors; and
   wherein each of the noise filters switches the resistors and/or the capacitors according to a scanning timing of the pair of adjacent transmission signal lines or a scanning timing of the pair of adjacent reception signal lines, by setting a plurality of areas for the transmission signal lines and the reception signal lines, and switching the resistors and the capacitors for performing the filtering operation for each area to be scanned, each area being defined by the transmission signal lines and the reception signal lines.

2. The touch panel driving device of claim 1, further comprising:
a selection circuit configured to sequentially select and electrically connect two reception signal lines from the M number of reception signal lines arranged on the touch panel with two reception signal lines separately provided between the touch panel and the reception circuit for supplying the reception signals to the reception circuit;
wherein the noise filters are provided on signal paths of the separately provided two reception signal lines respectively between the selection circuit and the reception circuit.

3. The touch panel driving device of claim 1, wherein each of the noise filters switches the resistors or the capacitors according to a scanning timing of the pair of adjacent transmission signal lines arranged on the touch panel or a scanning timing of the pair of adjacent reception signal lines arranged on the touch panel.

4. A touch panel device comprising:
a touch panel;
a touch panel driving device configured to sequentially perform a scanning of selecting a pair of adjacent transmission signal lines from N number of transmission signal lines and a pair of adjacent reception signal lines from M number of reception signal lines arranged on the touch panel wherein M and N are a natural number of 3 or more, and wherein the touch panel driving device includes a reception circuit configured to respectively receive, from the pair of adjacent reception signal lines of the touch panel, reception signals whose waveforms are changed due to a capacitance change caused by a touch operation and generate a detection value for detecting the touch operation on the touch panel by comparing the reception signals; and
a plurality of noise filters each of which is configured to perform a filtering operation of the same filtering characteristics on each of the reception signals supplied from the pair of adjacent reception signal lines to the reception circuit,
wherein each of the noise filters is configured to have a plurality of resistors having different resistance values and a plurality of capacitors having different capacitance values and switchably select the resistors and/or the capacitors; and
wherein each of the noise filters switches the resistors and/or the capacitors according to a scanning timing of the pair of adjacent transmission signal lines or a scanning timing of the pair of adjacent reception signal lines, by setting a plurality of areas for the transmission signal lines and the reception signal lines, and switching the resistors and the capacitors for performing the filtering operation for each area to be scanned, each area being defined by the transmission signal lines and the reception signal lines.

5. The touch panel device of claim 4, wherein the noise filters are respectively provided for the M number of the reception signal lines arranged on the touch panel.

6. A touch panel driving method comprising:
sequentially performing a scanning of selecting a pair of adjacent transmission signal lines and a pair of adjacent reception signal lines arranged on a touch panel;
performing, by a plurality of noise filters, a filtering operation of the same filtering characteristics on each of reception signals supplied from the pair of adjacent reception signal lines to a reception circuit on signal paths from the M number of reception signal lines of the touch panel to the reception circuit; and
allowing the reception circuit to respectively receive, from the pair of adjacent reception signal lines of the touch panel, the reception signals whose waveforms are changed due to a capacitance change caused by a touch operation and generate a detection value for detecting the touch operation on the touch panel by comparing the reception signals,
wherein each of the noise filters is configured to have a plurality of resistors having different resistance values and a plurality of capacitors having different capacitance values and switchably select the resistors and/or the capacitors, and
wherein each of the noise filters switches the resistors and/or the capacitors according to a scanning timing of the pair of adjacent transmission signal lines or a scanning timing of the pair of adjacent reception signal lines, by setting a plurality of areas for the transmission signal lines and the reception signal lines, and switching the resistors and the capacitors for performing the filtering operation for each area to be scanned, each area being defined by the transmission signal lines and the reception signal lines.

* * * * *